United States Patent
Yi et al.

(10) Patent No.: US 11,070,074 B2
(45) Date of Patent: Jul. 20, 2021

(54) APPARATUS AND METHOD FOR CHARGING BATTERY BASED ON TEMPERATURE

(71) Applicant: Samsung Electronics Co., Ltd., Gyeonggi-do (KR)

(72) Inventors: Yong Seung Yi, Seoul (KR); Du Hyun Kim, Gyeonggi-do (KR); Hyun Seok Kim, Gyeonggi-do (KR); Ho Yeong Lim, Gyeonggi-do (KR); Dong Il Son, Gyeonggi-do (KR)

(73) Assignee: Samsung Electronics Co., Ltd

( * ) Notice: Subject to any disclaimer, the term of this patent is extended or adjusted under 35 U.S.C. 154(b) by 524 days.

(21) Appl. No.: 15/917,169

(22) Filed: Mar. 9, 2018

(65) Prior Publication Data
US 2018/0262043 A1    Sep. 13, 2018

(30) Foreign Application Priority Data

Mar. 10, 2017   (KR) .................. 10-2017-0030845

(51) Int. Cl.
| | |
|---|---|
| *H02J 7/00* | (2006.01) |
| *H01M 10/44* | (2006.01) |
| *H01M 10/48* | (2006.01) |
| *H01M 10/46* | (2006.01) |
| *H02J 50/10* | (2016.01) |
| *H04B 5/00* | (2006.01) |

(52) U.S. Cl.
CPC ..... *H02J 7/007192* (2020.01); *H01M 10/443* (2013.01); *H01M 10/46* (2013.01); *H01M 10/486* (2013.01); *H02J 7/0091* (2013.01); *H02J 50/10* (2016.02); *H04B 5/0037* (2013.01)

(58) Field of Classification Search
CPC .... H02J 7/007192; H02J 7/0091; H02J 50/10; H01M 10/443; H01M 10/46; H01M 10/486; H04B 5/0037
USPC ................. 320/107, 108, 113, 115, 134, 150
See application file for complete search history.

(56) References Cited

U.S. PATENT DOCUMENTS 8,350,533 B2    1/2013  Tam et al.
9,197,096 B2 *  11/2015 Bhardwaj ............. H02J 7/0091
(Continued)

FOREIGN PATENT DOCUMENTS

CN          106059011        10/2016

OTHER PUBLICATIONS

European Search Report dated Jul. 11, 2018 issued in counterpart application No. 18161085.8-1202, 10 pages.

*Primary Examiner* — Edward Tso
*Assistant Examiner* — Aaron Piggush
(74) *Attorney, Agent, or Firm* — The Farrell Law Firm, P.C.

(57) ABSTRACT

Disclosed is an electronic device including a battery; a temperature sensor; a charging circuit configured to charge the battery; a coil antenna; and at least one processor configured to measure a temperature corresponding to at least a part of the electronic device by using the temperature sensor; charge the battery depending on a first charging characteristic by using the charging circuit and supply a current to the coil antenna to allow the coil antenna to emit heat, when the temperature satisfies a first specified condition; and charge the battery depending on a second charging characteristic by using the charging circuit, when the temperature satisfies a second specified condition, after the current is supplied.

20 Claims, 14 Drawing Sheets

(56) References Cited

U.S. PATENT DOCUMENTS

| | | | |
|---|---|---|---|
| 2006/0220620 A1* | 10/2006 | Aradachi | H02J 7/0091 |
| | | | 320/150 |
| 2009/0167253 A1* | 7/2009 | Muraoka | B60L 58/26 |
| | | | 320/152 |
| 2010/0277128 A1* | 11/2010 | Tam | G06F 1/263 |
| | | | 320/150 |
| 2011/0052944 A1 | 3/2011 | Matthias et al. | |
| 2014/0070761 A1* | 3/2014 | Labbe | A61N 1/3787 |
| | | | 320/108 |
| 2016/0165748 A1 | 6/2016 | Chen | |
| 2018/0013311 A1* | 1/2018 | Provencher | H01M 10/486 |

* cited by examiner

APPARATUS AND METHOD FOR CHARGING BATTERY BASED ON TEMPERATURE

PRIORITY

This application is based on and claims priority under 35 U.S.C. § 119 to Korean Patent Application No. 10-2017-0030845, filed on Mar. 10, 2017, in the Korean Intellectual Property Office, the disclosure of which is incorporated by reference herein in its entirety.

BACKGROUND

1. Field

The present disclosure relates generally to an electronic device charging a battery included in the electronic device by using power received from an external power source, and a method for charging the battery in the electronic device.

2. Description of Related Art

With the development of electronic technologies, various types of electronic products have been developed and distributed. In particular, portable electronic devices, which have a variety of functions, such as a smartphone, a tablet personal computer (PC), etc. have become increasingly used.

The portable electronic device employs, as a power source, a battery embedded in the electronic device or detachable from the electronic device determined by how portable the electronic needs to be. Batteries with increased capacity have been developed, but the capacity of the battery is limited. A user may charge the battery by using a charging device when the residual capacity of the battery in a portable electronic device is insufficient.

Various charging technologies, such as fast charging or wireless charging, have been developed to improve the convenience to the user when charging a battery. The charging technologies allow stable battery charging at room temperature, but may cause the reduction in a battery lifespan at a lower or higher temperature, due to a battery characteristic being sensitive to lower or higher temperatures.

SUMMARY

Aspects of the present disclosure are to address at least the above-mentioned problems and/or disadvantages and to provide at least the advantages described below. Accordingly, an aspect of the present disclosure is to provide an electronic device, capable of recovering the battery to be in a state allowing normal charging when the battery is charged in a lower-temperature environment.

In accordance with an aspect of the present disclosure, an electronic device includes a battery; a temperature sensor; a charging circuit configured to charge the battery; a coil antenna; and at least one processor configured to measure a temperature corresponding to at least a part of the electronic device by using the temperature sensor; charge the battery depending on a first charging characteristic by using the charging circuit and supply a current to the coil antenna to allow the coil antenna to emit heat, when the temperature satisfies a first specified condition; and charge the battery depending on a second charging characteristic by using the charging circuit, when the temperature satisfies a second specified condition, after the current is supplied.

In accordance with an aspect of the present disclosure, a method of charging a battery of an electronic device includes measuring a temperature corresponding to at least a part of the electronic device by using a temperature sensor; charging the battery depending on a first charging characteristic by using a charging circuit, when the temperature satisfies a first specified condition; supplying a current to a coil antenna to allow the coil antenna to emit heat, when the temperature satisfies the first specified condition; and charging the battery depending on a second charging characteristic by using the charging circuit, when the temperature satisfies a second specified condition, after the current is supplied.

In accordance with an aspect of the present disclosure, an electronic device includes a battery; a temperature sensor; a charging circuit; a heating element; and at least one processor configured to measure a temperature corresponding to at least a part of the electronic device by using the temperature sensor; charge the battery depending on a first charging characteristic by using the charging circuit and supply a current to the heating element to allow the heating element to emit heat, when the temperature satisfies a first specified condition; charge the battery depending on a second charging characteristic by using the charging circuit, when the temperature satisfies a second specified condition, after the current is supplied to the heating element; and reduce a magnitude of the current supplied to the heating element or stop supplying the current to the heating element, when the temperature satisfies a third specified condition, after the current is supplied.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Those of ordinary skill in the art will recognize that modifications, equivalents, and/or alternatives on the various embodiments described herein can be made without departing from the scope and spirit of the present disclosure.

Figure 1:
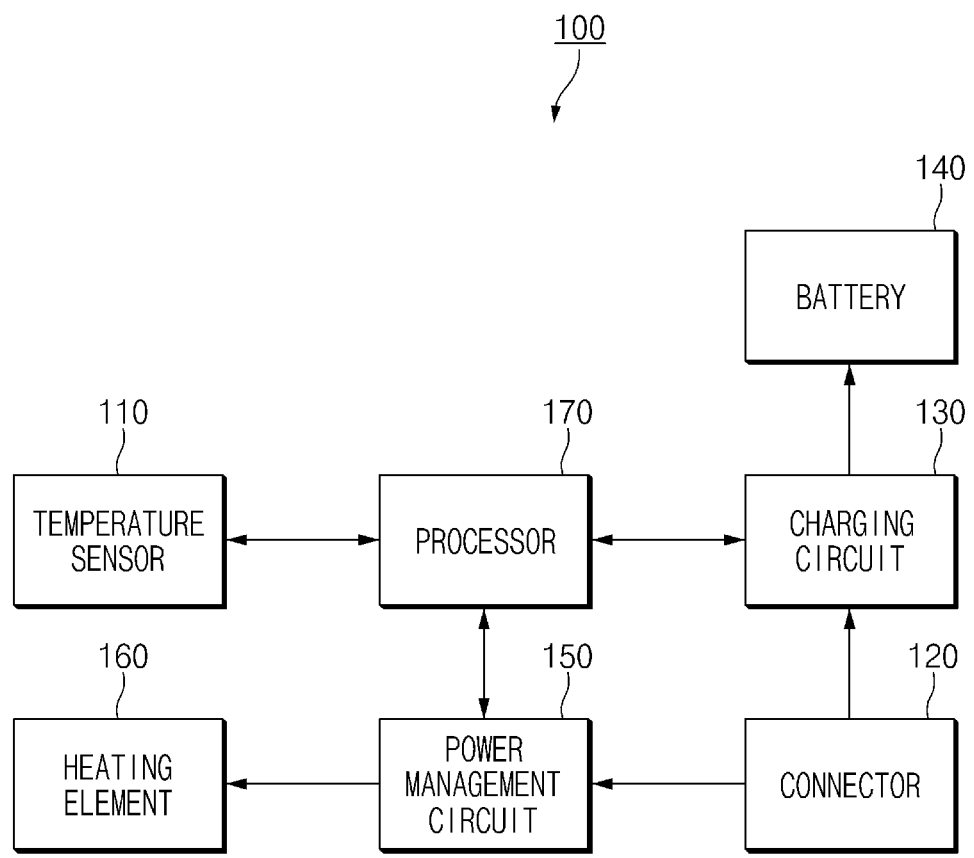
FIG. 1 is a block diagram illustrating elements of an electronic device, according to an embodiment.

FIG. 1 is a block diagram illustrating elements of an electronic device, according to an embodiment.

Referring to FIG. 1, an electronic device 100 may include a temperature sensor 110, a connector 120, a charging circuit 130, a battery 140, a power management circuit 150, a heating element 160, and a processor 170.

According to an embodiment, the temperature sensor 110 may measure (or sense) a temperature corresponding to at least a part of the electronic device 100. For example, the temperature sensor 110 may be disposed to directly make contact with the battery 140 or may be disposed in an area adjacent to the battery 140 to measure the temperature of the battery 140 (or the area adjacent to the battery 140). The temperature sensor 110 may measure the temperature at a specified period or may aperiodically measure the temperature in response to a command received from the processor 170.

According to an embodiment, the temperature sensor 110 may include a contact temperature sensor making contact with the battery 140 (or the area adjacent to the battery 140) to measure the temperature of the battery 140 (or the area adjacent to the battery 140). For example, the temperature sensor 110 may include a thermistor (e.g., a negative temperature coefficient (NTC) thermistor or a positive temperature coefficient (PTC) thermistor), which measures the temperature based on a resistance according to the temperature, or a thermocouple which measures the temperature based on an electromotive force according to the temperature.

According to an embodiment, the electronic device 100 may include a plurality of temperature sensors. The temperature sensors may measure temperatures of, for example, different regions (or positions) around the battery. The electronic device 100 may include a sheet-shaped temperature sensor (e.g., a thin film thermistor or a thermocouple sheet) which measures a temperature corresponding to a region having a specified area or more. For example, the sheet-shaped temperature sensor is attached to at least one surface of the battery to measure the temperature of the battery. The temperature sensor 110 may further include a temperature sensor which is used for measuring an external temperature (e.g., an ambient temperature) of the electronic device 100.

According to an embodiment, the connector 120 is connected with an external power source to receive power from the external power source. The connector 120 may be connected with the external power source (e.g., at 120 V) through an adaptor. The adaptor may include a first connector connected with the external power source and a second connector connected with the connector 120 of the electronic device 100. The adaptor may transmit power, which is received through the first connector, to the electronic device 100 through the second connector. The power received through the connector 120 may be transmitted to the charging circuit 130 and/or the power management circuit 150.

According to an embodiment, the charging circuit 130 may charge the battery 140 with power received from the external power source under the control of the processor 170. The charging circuit 130 may charge the battery 140 in a wired charging method and/or a wireless charging method. The charging circuit 130 may charge the battery 140 with power received through the connector 120 configured in the wired charging method. The charging circuit 130 may charge the battery 140 with power received through a wireless charging antenna configured in the wireless charging method. The wireless charging method may include a magnetic resonance method, a magnetic induction method, or an electromagnetic method.

According to an embodiment, the charging circuit 130 may charge the battery 140 depending on a specified charging characteristic. The charging characteristic may include, for example, a charging power, a charging voltage, a charging current, and a fully charged voltage. The charging characteristic of the charging circuit 130 may be determined depending on the temperature measured by the temperature sensor 110. The charging circuit 130 may charge the battery 140 depending on the first charging characteristic if the temperature measured by the temperature sensor 110 satisfies the first specified condition (e.g., less than about 10° C.). The charging circuit 130 may charge the battery 140 depending on a second charging characteristic if the temperature measured by the temperature sensor 110 satisfies the second specified condition (e.g., about 10° C. to 45° C.). The second charging characteristic may include a charging characteristic corresponding to a charging characteristic of a typical charging or a fast charging at room temperature.

According to an embodiment, the battery 140 may supply power to each of elements included in the electronic device 100 under the control of the power management circuit 150. The battery 140 may include a rechargeable battery (e.g., a lithium-ion battery) and/or a solar cell.

According to an embodiment, the power management circuit 150 may manage power stored in the battery 140 or power received from the external power source through the connector 120. The power management circuit 150 may include a power management integrated circuit (PMIC) including a buck converter. The power management circuit 150 may change the power stored in the battery 140 or received from the external power source to a voltage corresponding to each element included in the electronic device 100 and may output the changed voltage.

According to an embodiment, the power management circuit 150 may supply a current to the heating element 160 when the temperature measured by the temperature sensor 110 satisfies the first specified condition (e.g., less than about 10° C.) while the battery 140 is being charged by the charging circuit 130. The power management circuit 150 may supply a current to the heating element 160 using the remaining power, except for power consumed to charge the battery 140, received from the external power source. The power management circuit 150 may supply a current to the heating element 160 by using power stored in the battery 140.

Although the charging circuit 130 and the power management circuit 150 are separately configured in FIG. 1, the charging circuit 130 and the power management circuit 150 may be integrated into a single element (e.g., a single integrated circuit (IC) chip).

According to an embodiment, the heating element 160 may emit heat depending on a current supplied from the power management circuit 150. The heating element 160 may directly make contact with the battery 140 or may be disposed at a position adjacent to the battery 140 to efficiently transfer heat to the battery 140. The heating element 160 may include a heat emitting device which is not used for purposes other than heating during the charging of the battery 140 or performs a control operation not to be used for purposes other than heating during the charging of the battery 140. The heating element 160 may include a coil, a resistor, a heat pipe, or a thermoelectric device. The coil may include a coil antenna (or a loop antenna) to transmit or receive a signal or data to or from an external electronic device. For example, the coil antenna may include a magnetic secure transmission (MST) antenna, a wirelessly charging antenna, or a near field communication (NFC) antenna. The heating element 160 may further include another type of an antenna other than the coil antenna. For example, the heating element 160 may include a patch antenna, a slot antenna, a monopole antenna, a dipole antenna, or a helical antenna.

According to an embodiment, the processor 170 may control the overall operation of the electronic device 100. The processor 170 may control each of the temperature sensor 110, the charging circuit 130, and the power management circuit 150 to charge the battery 140. The electronic device 100 may include at least one processor (e.g., a plurality of processors). The processor 170 may be implemented as a system on chip (SoC) that includes at least one central processing unit (CPU), a graphic processing unit (GPU), a memory, etc.

According to an embodiment, the processor 170 may determine whether a charging event for the battery 140 occurs. The processor 170 may determine that the charging event for the battery 140 occurs, when an adaptor connected with the external power source is connected with the connector 120 or power is received to the charging circuit 130 through a power supply line (e.g., Vbus).

According to an embodiment, the processor 170 may measure the temperature corresponding to a part of the electronic device 100 by using the temperature sensor 110. The processor 170 may measure the temperature by using the temperature sensor 110 when the charging event for the battery 140 occurs. The processor 170 may measure the temperature using a plurality of temperature sensors. When measuring the temperature using the temperature sensors, the processor 170 may set a representative value (e.g., an average value) from a plurality of temperature values, which are measured by the temperature sensors, as the temperature of the battery 140.

According to an embodiment, the processor 170 may charge the battery 140 using the charging circuit 130 when the charging event for the battery 140 occurs. The charging circuit 130 may charge the battery 140 with power received from the external power source through the connector 120 or the wireless charging antenna. The processor 170 may control the charging circuit 130 to charge the battery 140 depending on a specified charging characteristic.

According to an embodiment, the processor 170 may determine the charging characteristic of the charging circuit 130 depending on the temperature measured by the temperature sensor 110 after the charging event for the battery 140 occurs. The processor 170 may charge the battery 140 depending on the first charging characteristic by using the charging circuit 130 when the temperature measured by the temperature sensor 110 satisfies the first specified condition (e.g., less than about 10° C.). The processor 170 may charge the battery 140 depending on the second charging characteristic by using the charging circuit 130 when the temperature measured by the temperature sensor 110 satisfies the second specified condition (e.g., about 10° C. to 45° C.). The second charging characteristic may include a charging power, a charging current, and a fully charged voltage higher than a charging power, a charging current, and a fully charged voltage of the first charging characteristic. The first charging characteristic may include charging power (e.g., less than about 2.5 watts) having the first magnitude, and the second charging characteristic may include charging power (e.g., less than about 10 watts) having the second magnitude higher than the first magnitude. The first charging characteristic may include a charging current (e.g., less than about 0.5 amperes) having the first magnitude, and the second charging characteristic may include a charging current (e.g., about less than 2 amperes) having the second magnitude higher than the first magnitude. The first charging characteristic may include a fully charged voltage (e.g., about 4.2 volts) having the first magnitude, and the second charging characteristic may include a fully charged voltage (e.g., about 4.4 volts) having the second magnitude higher than the first magnitude.

When the battery 140 is in a low-temperature state (e.g., when the temperature of the battery 140 satisfies the first specified condition), the internal resistance of the battery is increased and ion conductance may be reduced as the viscosity of electrolyte included in the battery 140 is increased. Accordingly, when the battery 140 is charged in the low-temperature state, the charging performance of the battery 140 may be deteriorated, the capacity of the battery 140 may be reduced, the battery 140 may be damaged, or the lifespan of the battery 140 may be reduced. When the battery 140 is in the lower-temperature state, the processor 170 may charge the battery 140, based on charging power, a charging current, and a fully charged voltage lower than a charging power, a charging current, and a fully charged voltage when the battery 140 is in a room temperature state (e.g., when the temperature of the battery 140 satisfies the second specified condition, for the purpose of the stability of the battery 140.

According to an embodiment, the processor 170 may supply a current to the heating element 160 by using the power management circuit 150 when the temperature measured by the temperature sensor 110 satisfies the first specified condition (e.g., less than about 10° C.). The processor 170 may determine remaining power (or available power), except for power consumed to charge the battery 140, as the power received from the external power source. The processor 170 may supply a current to the heating element 160 by using a portion of the determined available power. The processor 170 may supply the current to the heating element 160 by using power stored in the battery 140. The processor 170 may determine the magnitude of the current supplied to the heating element 160, depending on a temperature measured by the temperature sensor 110. The processor 170 may increase an amount of heat emitted from the heating element 160 by increasing the magnitude of the current supplied to the heating element 160 as the temperature measured by the temperature sensor 110 is lowered.

According to an embodiment, the processor 170 may determine the power received from the external power source through the connector 120 and power consumed by the charging circuit 130 to charge the battery 140. The processor 170 may exchange information (e.g., device identification information or supplied power information) with the adaptor through the connector 120 when connected with the adaptor through the connector 120. The processor 170 may determine power supplied by the adaptor by using the information received from the adaptor. The processor 170 may determine the available power by subtracting the power consumed in charging the battery 140 from the power received from the external power source.

According to an embodiment, when the processor 170 fails to receive information from the adaptor or fails to determine power supplied by the adaptor depending on the received information, the processor 170 gradually increases power consumed by elements included in the electronic device 100 to determine the available power. The processor 170 may supply a portion of power, which is received from the external power source through the power management circuit 150, to elements included in the electronic device 100. The processor 170 may increase power consumed by the elements included in the electronic device 100 as time elapses. When the power consumed by the elements included in the electronic device 100 exceeds the available power, the power consumed to charge the battery 140 may be reduced. Accordingly, the processor 170 may determine power, which is consumed by elements included in the electronic device 100 at the moment that the power consumed to charge the battery 140 is reduced, as the available power.

According to an embodiment, the processor 170 may perform a specified operation to self-emit heat when the temperature measured by the temperature sensor 110 satisfies the first condition (e.g., less than about 10° C.). The processor 170 may load and process specific data (e.g., dummy data) from a memory when the temperature measured by the temperature sensor 110 satisfies the first specified condition. The dummy data may refer to data which does not change the state of the electronic device 100 before and after the data is processed. The processor 170 may not perform an additional operation of transmitting a command to another element or of storing the processed data in the memory, depending on a data processing result, even if the dummy data is processed. The processor 170 may determine a data processing rate, depending on the temperature measured by the temperature sensor 110. The processor 170 may increase an amount of heat emitted by increasing the data processing rate as the temperature measured by the temperature sensor 110 is lowered.

According to an embodiment, the processor 170 may charge the battery 140 depending on the second charging characteristic by using the charging circuit 130, when the temperature measured by the temperature sensor 110 is changed to the temperature satisfying the second specified condition (e.g., about 10° C. to 45° C.) after a current is supplied to the heating element 160 or a specified operation is performed.

When the battery 140 is charged depending on the first charging characteristic, the battery 140 may not be completely charged as the charging speed and the fully charged voltage of the battery 140 are reduced, as compared to when the battery 140 is charged depending on the second charging characteristic. Accordingly, to improve the charging performance of the battery 140, the processor 170 may increase the temperature of the battery 140 through the heating element 160 or by performing a specified operation, when the battery is in the lower-temperature state, and may charge the battery 140 depending on the second charging characteristic after the temperature of the battery 140 is changed to a higher temperature.

According to an embodiment, the processor 170 may maintain the temperature of the battery 140 in the second specified condition after the temperature measured by the temperature sensor 110 is changed to a temperature satisfying the second condition (e.g., about 10° C. to 45° C.). The processor 170 may decrease or stop the supplying of a current to the heating element 160 (or may perform an operation data for specified data) when the temperature measured by the temperature sensor 110 is included in a third specified condition (e.g., more than about 25° C.) after supplying the current to the heating element 160 (or in the state of charging the battery 140 depending on the second charging characteristic). The processor 170 may increase the supplying (or an operation of specific data) of a current to the heating element 160 or resume the supplying (or performing of a specific operation) of the current to the heating element 160 when the temperature measured by the temperature sensor 110 satisfies a fourth specified condition (e.g., less than about 10° C. or less than about 15° C.) after the supplying of the current of the heating element 160 is reduced and stopped (or in the state of charging the battery 140 depending on the second charging characteristic).

According to an embodiment, the processor 170 may set the third specified condition and the fourth specified condition, based on the ambient temperature. The processor 170 may set temperatures satisfying the third specified condition and the fourth specified condition to be higher as the ambient temperature is reduced. The processor 170 may set the difference between the temperatures satisfying the third specified condition and the fourth specified condition to be increased as the ambient temperature is reduced.

According to an embodiment, the processor 170 may perform the above-described operation of maintaining the temperature, based on a charging progress state of the battery 140. For example, the processor 170 may perform the above operation of maintaining the temperature when the battery 140 is charged in a constant voltage (CV) section. The processor 170 may perform the above operation of maintaining the temperature, based on the ambient temperature. The processor 170 may perform the above operation of maintaining the temperature when the ambient temperature is less than a specific reference temperature (e.g., about 0° C.).

According to an embodiment, the electronic device 100 may maintain the stability and the durability of the battery 140 by charging the battery 140 depending on the charging characteristic appropriate to the temperature of the battery 140. When the battery 140 is in the lower-temperature state, the electronic device 100 may stably and rapidly charge the battery 140 under even the lower-temperature environment by increasing the temperature of the battery 140 using a portion of power received from the external power source.

Figure 2A:
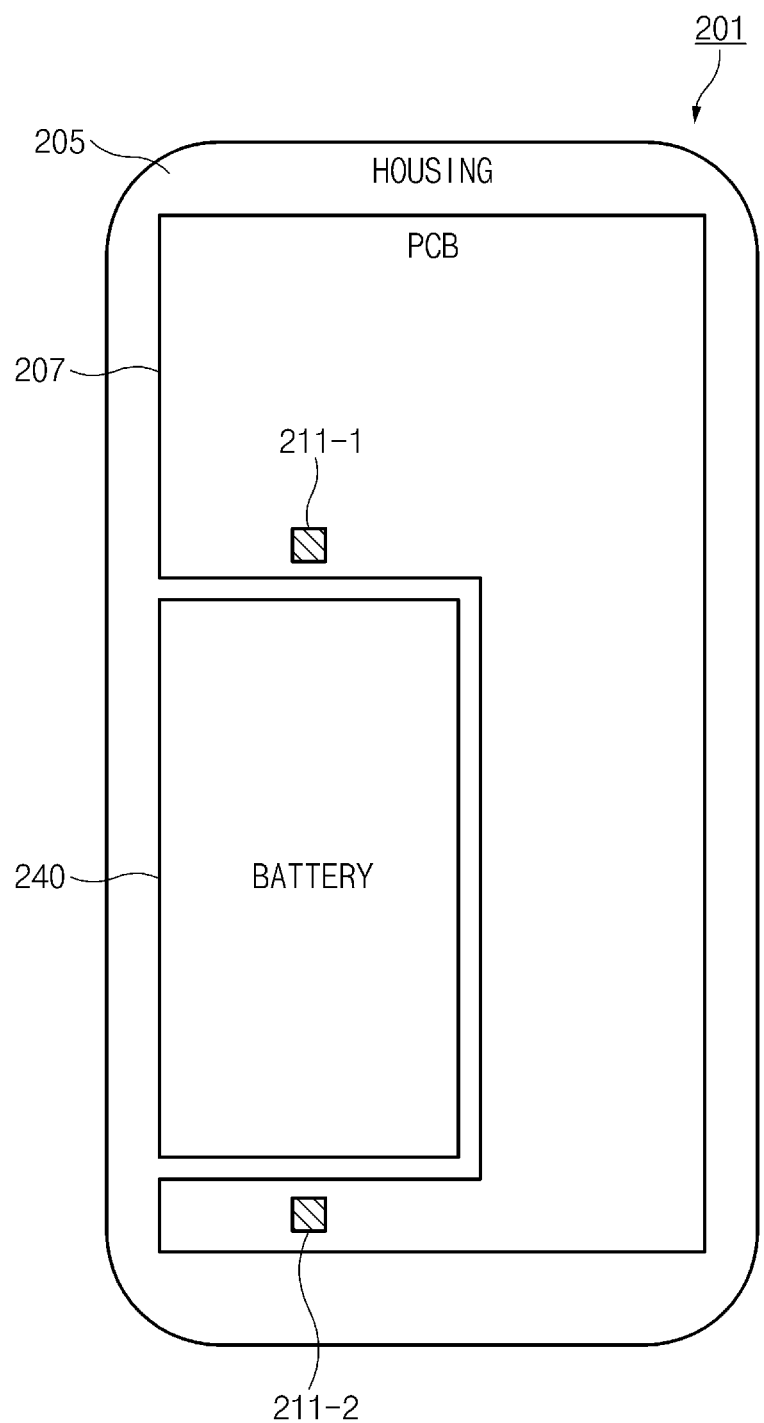
FIGS. 2A and 2B illustrate structures of electronic devices including temperature sensors, according to an embodiment.
Figure 2B:
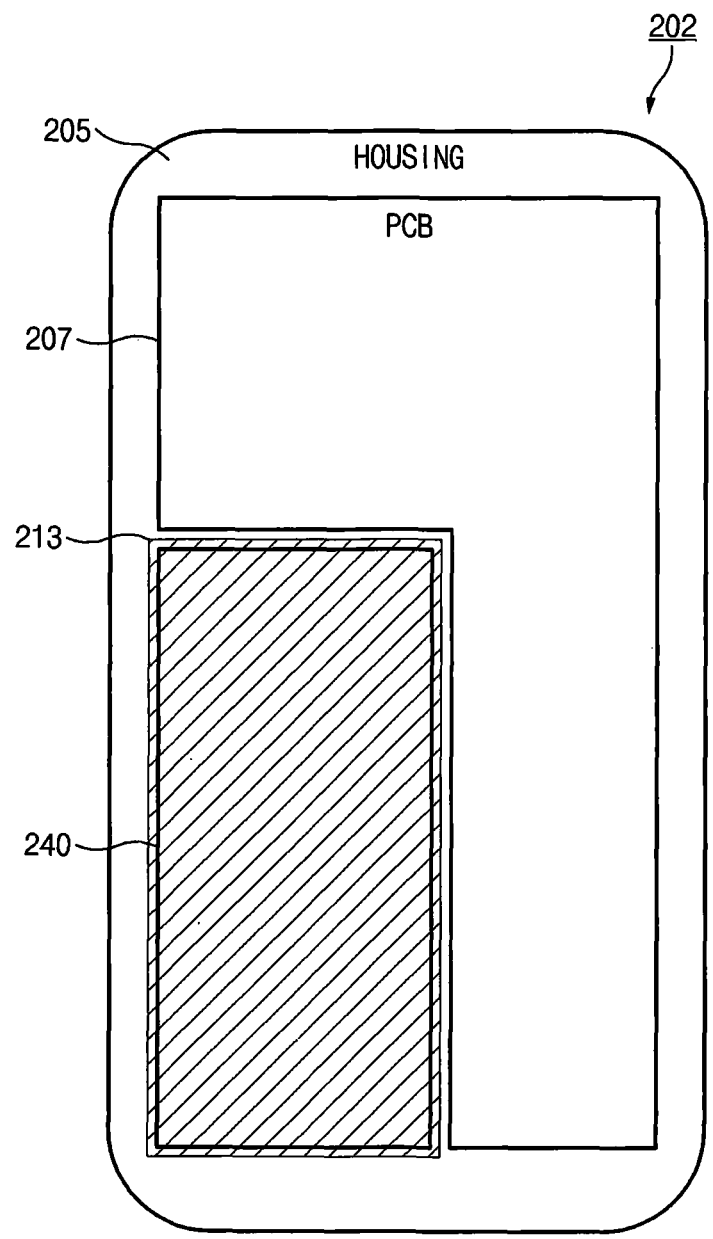

FIGS. 2A and 2B illustrate structures of electronic devices including temperature sensors, according to an embodiment.

Referring to FIG. 2A, an electronic device 201 may include a housing 205, a printed circuit board (PCB) 207, a first temperature sensor 211-1, a second temperature sensor 211-2, and a battery 240.

According to an embodiment, the housing 205 may constitute an outer appearance of the electronic device 201. The electronic device 201 may further include a display which is exposed to the outside through the housing 205 and constitutes at least a part of a first surface (e.g., a front surface) of the electronic device 201. The housing 205 may constitute at least a part of the second surface (e.g., a rear surface) of the electronic device 201 facing an opposite direction to the direction of the first surface. The PCB 207, the first temperature sensor 211-1, the second temperature sensor 211-2, and the battery 240 may be disposed in the housing 205.

According to an embodiment, the first temperature sensor 211-1 and the second temperature sensor 211-2 may be disposed on the PCB 207. The first temperature sensor 211-1 and the second temperature sensor 211-2 may be disposed adjacent to the battery 240. For example, the first temperature sensor 211-1 may be disposed in a first direction (e.g., an upper-side direction) from the battery 240 and the second temperature sensor 211-2 may be disposed in a second direction (e.g., a bottom-side direction) from the battery 240.

According to an embodiment, the electronic device 201 may more exactly measure the temperature of the battery 240 by measuring temperatures using the first temperature sensor 211-1 and the second temperature sensor 211-2 disposed at a plurality of positions.

Referring to FIG. 2B, an electronic device 202 may include a housing 205, a PCB 207, a sensor 213, and a battery 240.

According to an embodiment, the housing 205 may constitute an outer appearance of the electronic device 202. The PCB 207, the temperature sensor 213, and the battery 240 may be disposed in the housing 205.

According to an embodiment, the temperature sensor 213 may have a sheet shape. The temperature sensor 213 having the sheet shape may be directly attached to at least one surface of the battery 240 to measure the temperature of the battery 240.

According to an embodiment, the electronic device 202 may more exactly measure the temperature of the battery 240 by measuring the temperature using the temperature sensor 213 directly attached to the battery 240 and having a sheet shape to cover a wider area.

FIGS. 3A to 3D illustrate structures of electronic devices including heating elements, according to an embodiment.

Figure 3A:
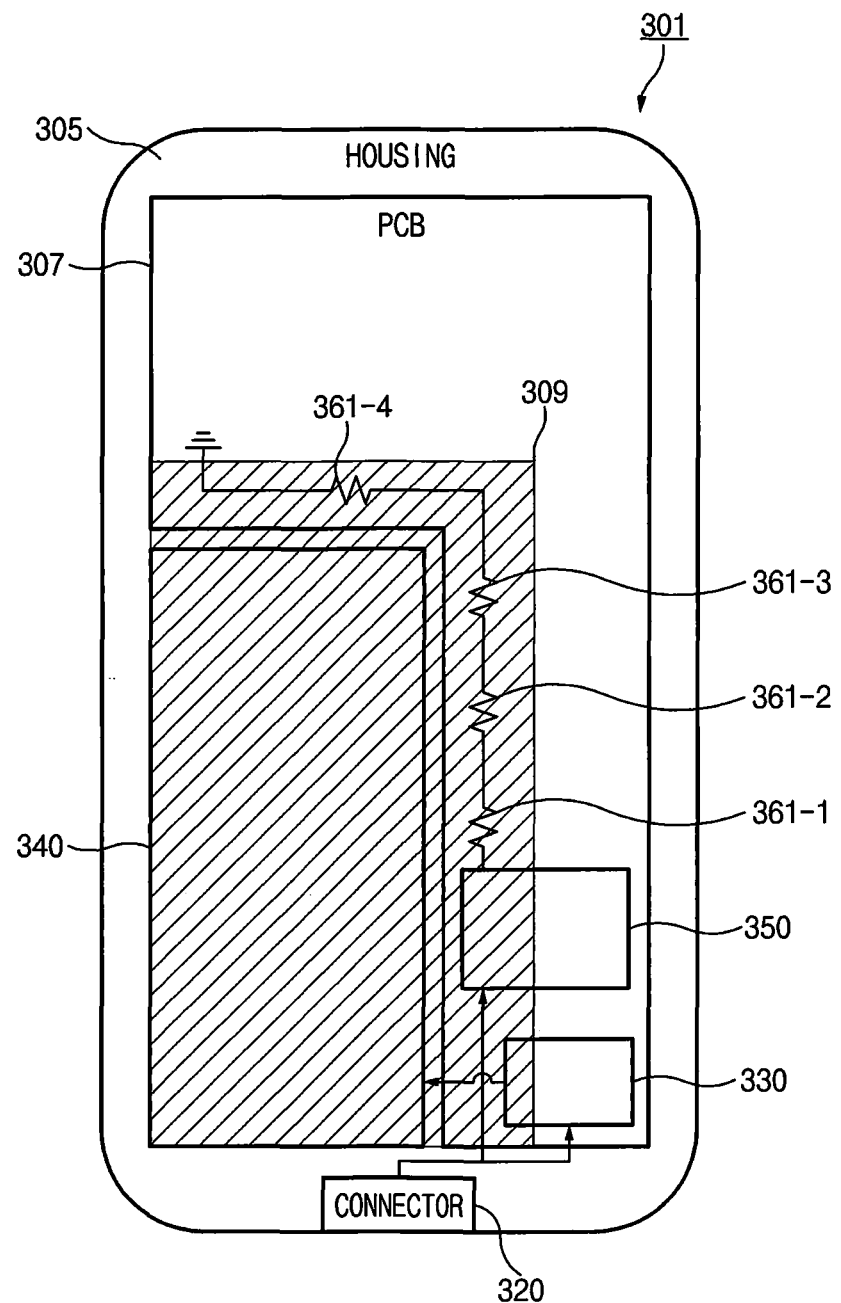
FIGS. 3A to 3D illustrate structures of electronic devices including heating elements, according to an embodiment.

Referring to FIG. 3A, an electronic device 301 may include a housing 305, a PCB 307, a thermal diffusion sheet 309, a connector 320, a charging circuit 330, a battery 340, a power management circuit 350, and a plurality of resistors 361-1, 361-2, 361-3, and 361-4.

According to an embodiment, the housing 305 may constitute an outer appearance of the electronic device 301. The electronic device 301 may further include a display exposed to the outside through the housing 305 and constituting at least a part of a first surface (e.g., a front surface) of the electronic device 301. The housing 305 may constitute at least a part of the second surface (e.g., a rear surface) of the electronic device 301 facing an opposite direction to the direction of the first surface. The PCB 307, the thermal diffusion sheet 309, the connector 320, the charging circuit 330, the battery 340, the power management circuit 350, and the resistors 361-1, 361-2, 361-3, and 361-4 may be disposed in the housing 305. The PCB 307, the thermal diffusion sheet 309, the connector 320, the charging circuit 330, the battery 340, the power management circuit 350, and the resistors 361-1, 361-2, 361-3, and 361-4 may be interposed between the first surface (e.g., a front surface) of the housing 305 and the second surface (e.g., the rear surface) facing the opposite direction to the direction of the first surface. The connector 320 may be exposed to the outside through at least one surface (e.g., the bottom-side direction) of the housing 305.

According to an embodiment, the charging circuit 330, the power management circuit 350, and the resistors 361-1, 361-2, 361-3, and 361-4 may be disposed on the PCB 307. The charging circuit 330 may charge the battery 340 with power received from the external power source through the connector 320. The power management circuit 350 may supply a current to the resistors 361-1, 361-2, 361-3, and 361-4 using power received from the external power source through the connector 320. The resistors 361-1, 361-2, 361-3, and 361-4 may be connected with each other in series and may be disposed at an area adjacent to the battery 340. The resistors 361-1, 361-2, 361-3, and 361-4 may emit heat depending on current received from the power management circuit 350. The thermal diffusion sheet 309 is attached to the battery 340 to transfer heat emitted from the resistors 361-1, 361-2, 361-3, and 361-4 to the battery 340. The thermal diffusion sheet 309 may be disposed to cover at least a partial region of the battery 340 and the resistors 361-1, 361-2, 361-3, and 361-4.

Figure 3B:
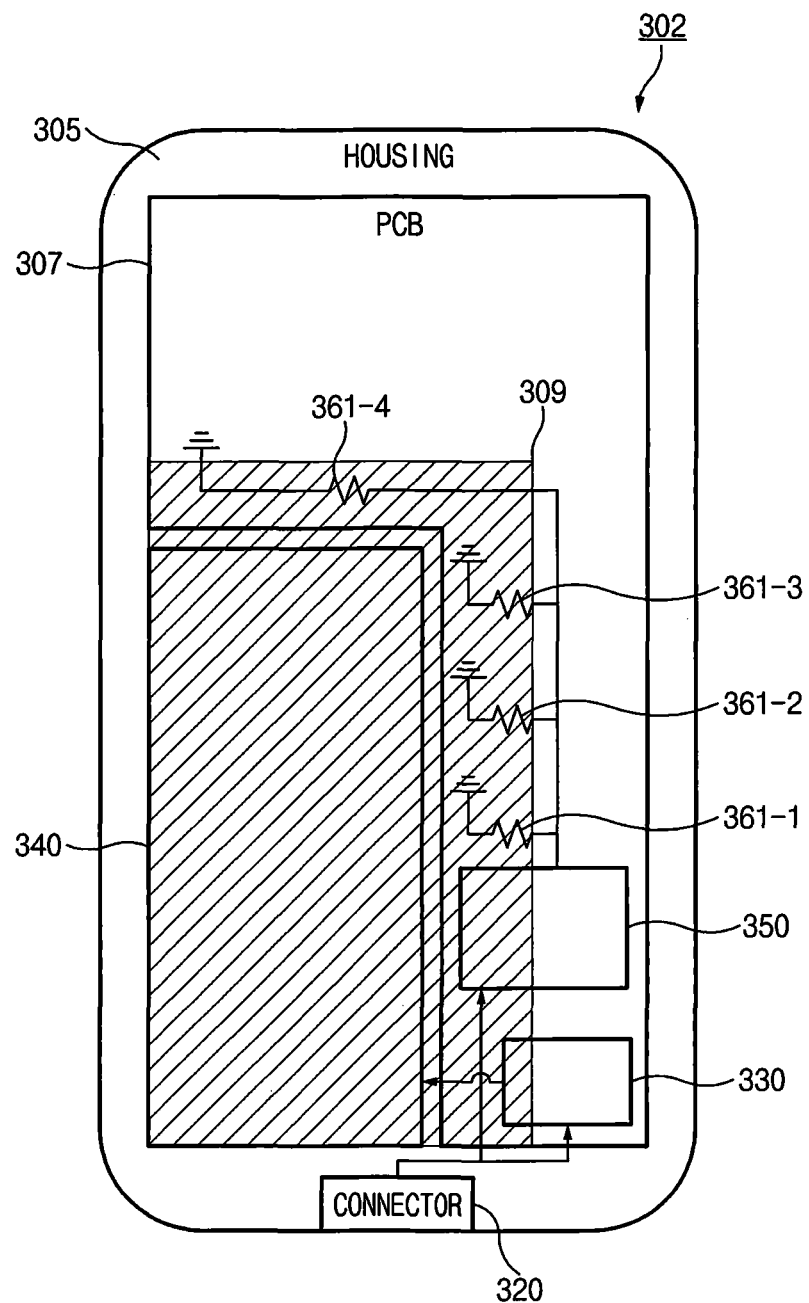

Referring to FIG. 3B, an electronic device 302 may include a housing 305, a PCB 307, a thermal diffusion sheet 309, a connector 320, a charging circuit 330, a battery 340, a power management circuit 350, and resistors 361-1, 361-2, 361-3, and 361-4. In contrast to electronic device 301, the resistors 361-1, 361-2, 361-3, and 361-4 may be connected with each other in parallel. Some of the resistors 361-1, 361-2, 361-3, and 361-4 are connected with each other in series and remaining resistors may be connected with each other in parallel.

Figure 3C:
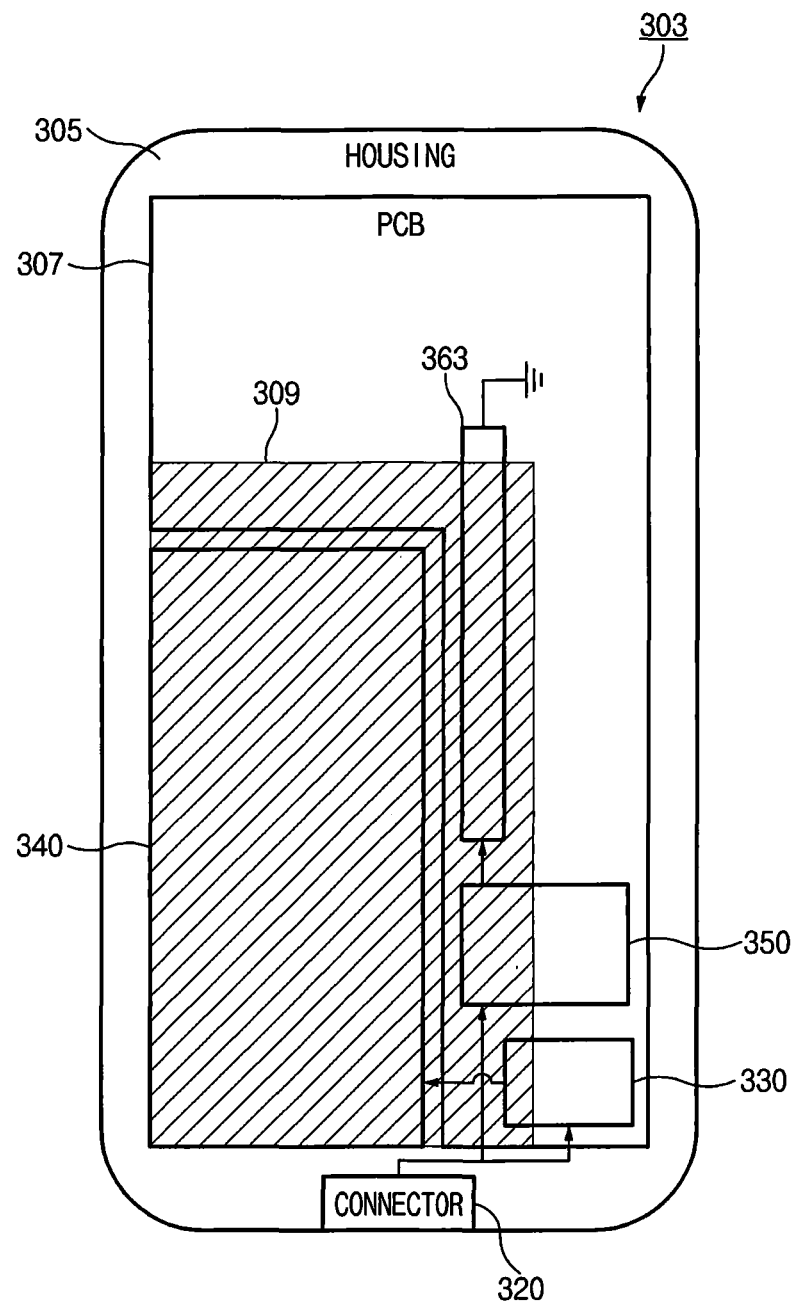

Referring to FIG. 3C, an electronic device 303 may include a housing 305, a PCB 307, a thermal diffusion sheet 309, a connector 320, a charging circuit 330, a battery 340, a power management circuit 350, and a heat pipe 363.

According to an embodiment, the PCB 307, the charging circuit 330, the battery 340, the power management circuit 350, and the heat pipe 363 may be disposed in the housing 305. The heat pipe 363 may be disposed at an area adjacent to the battery 340. The thermal diffusion sheet 309 is attached to the battery 340 to transmit heat emitted from the heat pipe 363 to the battery 340. The thermal diffusion sheet 309 may be disposed to cover at least a part of the battery 340 and at least a part of the heat pipe 363.

Figure 3D:
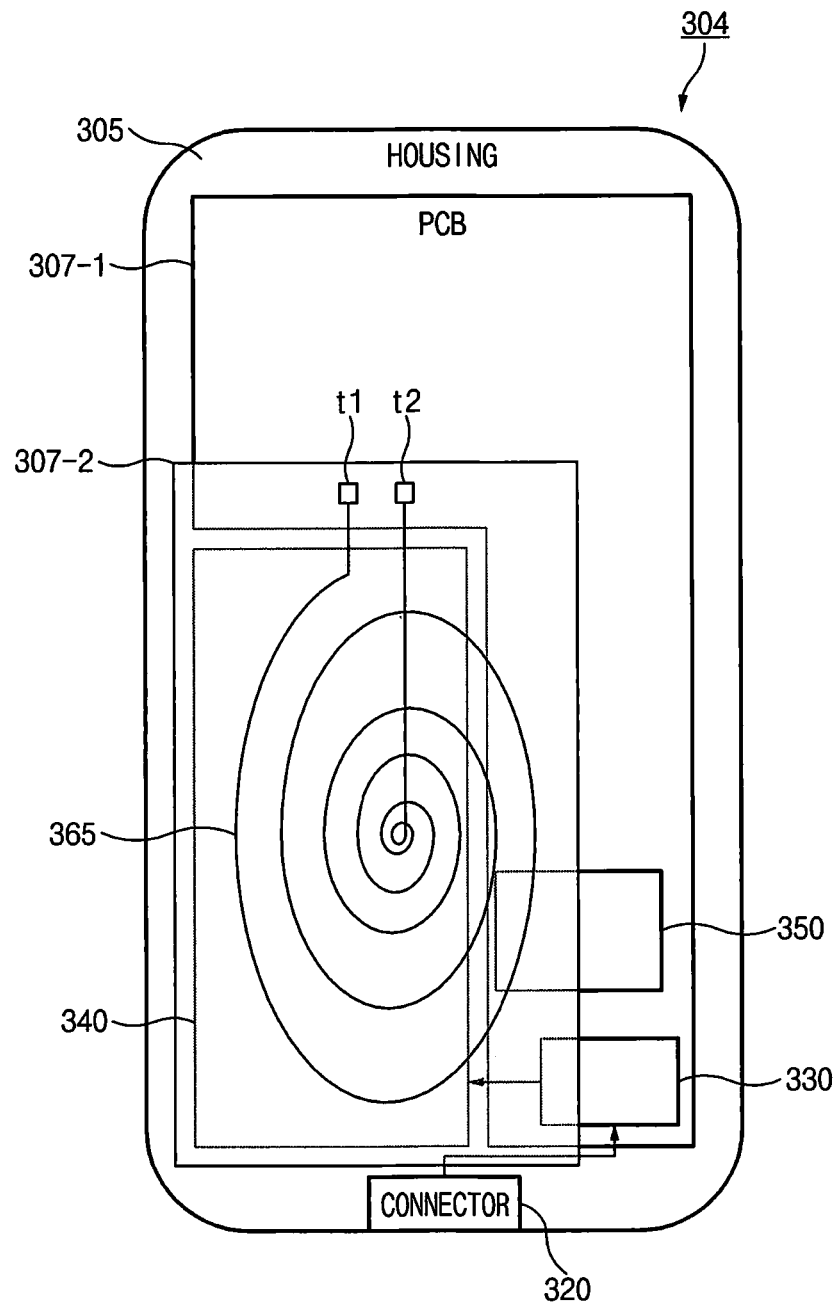

Referring to FIG. 3D, an electronic device 304 may include a housing 305, a first PCB 307-1, a second PCB 307-2, a connector 320, a charging circuit 330, a battery 340, a power management circuit 350, and a coil 365.

According to an embodiment, the first PCB 307-1, the second PCB 307-2, the connector 320, the charging circuit 330, the battery 340, the power management circuit 350, and the coil 365 may be disposed in the housing 305. The charging circuit 330 and the power management circuit 350 may be disposed on the first PCB 307-1.

According to an embodiment, the coil 365 may be disposed on the second PCB 307-2. The second PCB 307-2 may be disposed to overlap with the battery 340. Accordingly, the coil 365 disposed on the PCB 307-2 may be disposed to overlap with at least a part of the battery 340. One end of the coil 365 may be connected with a first terminal t1 and an opposite end of the coil 365 may be connected with a second terminal t2. The first terminal t1 may be connected with the ground and the second terminal t2 may be connected with the power management circuit 350. The coil 365 may emit heat depending on the current received from the power management circuit 350 through the second terminal t2.

Figure 4:
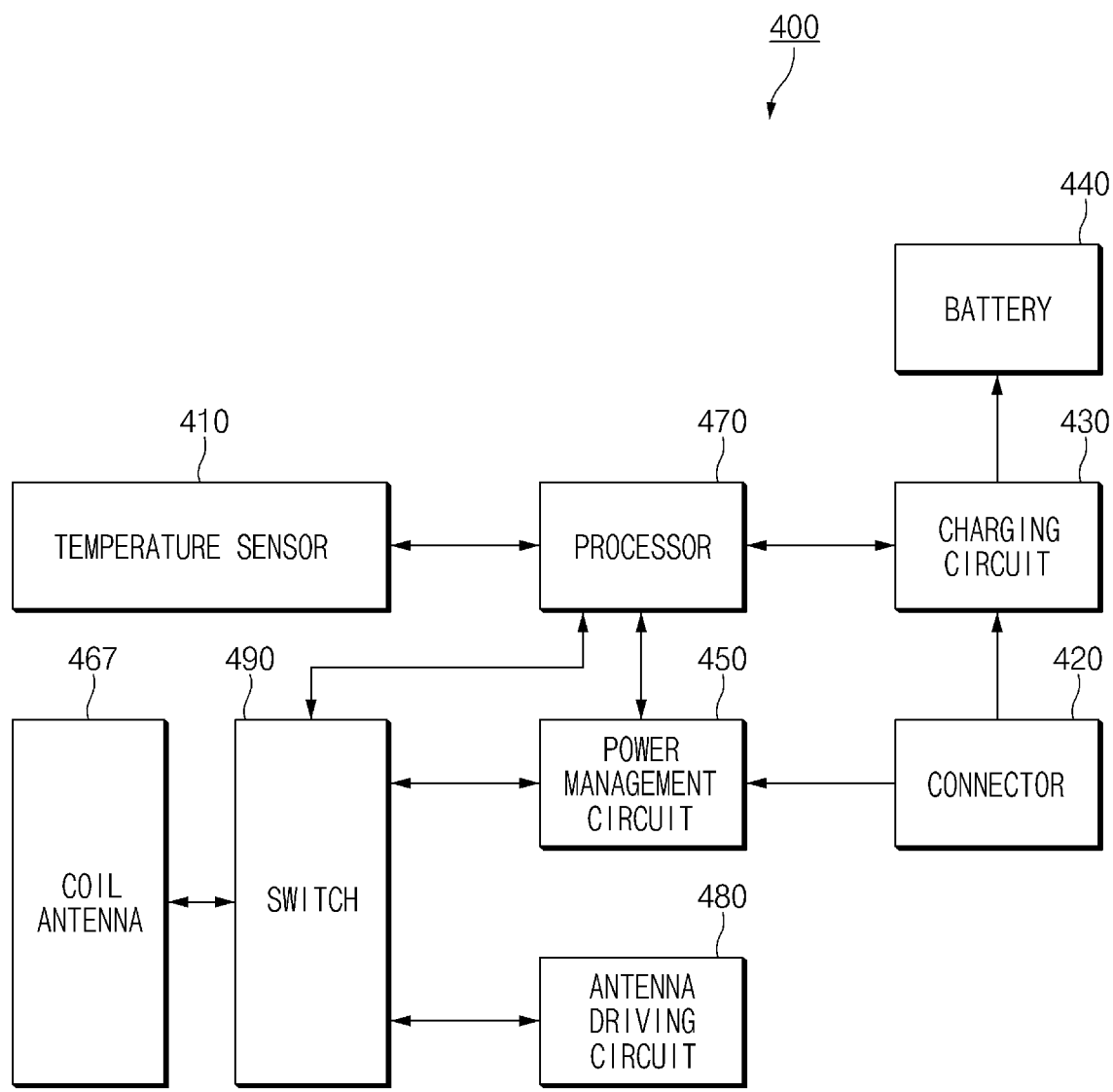
FIG. 4 is a block diagram illustrating elements of an electronic device, according to an embodiment.

FIG. 4 is a block diagram illustrating elements of an electronic device, according to an embodiment.

Referring to FIG. 4, an electronic device 400 may include a temperature sensor 410, a connector 420, a charging circuit 430, a battery 440, a power management circuit 450, a coil antenna 467, a processor 470, an antenna driving circuit 480, and a switch 490.

Since operations performed by the electronic device 400 are similar to the operations performed by the electronic device 100, the following description will be made while focusing on the difference between the electronic device 400 and the electronic device 100.

According to an embodiment, the coil antenna 467 may emit heat depending on a current supplied from the power management circuit 450. For example, the coil antenna 467 may include an MST antenna, a wirelessly charging antenna, or an NFC antenna.

According to an embodiment, the antenna driving circuit 480 may transmit or receive a signal to or from the external electronic device through the coil antenna 467. The antenna driving circuit 480 may include an MST circuit, a wirelessly charging circuit, and an NFC circuit.

According to an embodiment, the switch 490 may connect the coil antenna 467 with the power management circuit 450 or with the antenna driving circuit 480 under the control of the power management circuit 450, the antenna driving circuit 480, or the processor 470.

According to an embodiment, the processor 470 (or the power management circuit 450) may control the switch 490 to connect the coil antenna 467 with the power management circuit 450 when supplying the current to the coil antenna 467 to heat the coil antenna 467. The processor 470 may control the switch 490 to connect the coil antenna 467 with the power management circuit 450 when the temperature measured by the temperature sensor 410 satisfies the first specified condition (e.g., less than about 10° C.) after the charging event occurs. The processor 470 may control the switch 490 to connect the coil antenna 467 with the power management circuit 450 when the temperature measured by the temperature sensor 410 satisfies the fourth specified condition (e.g., less than about 10° C. or less than about 15° C.) after supplying current to the coil antenna 467 is stopped (or in the state of charging the battery 440 depending on the second charging characteristic). The processor 470 may supply a current to the coil antenna 467 by using the power management circuit 450 when the coil antenna 467 is connected with the power management circuit 450.

According to an embodiment, the processor 470 (or the antenna driving circuit 480) may control the switch 490 to connect the coil antenna 467 with the antenna driving circuit 480 in cases other than the state of supplying the current to the coil antenna 467 to heat the coil antenna 467. The processor 470 may control the switch 490 to connect the coil antenna 467 with the antenna driving circuit 480 when the processor 470 is in the state of charging the battery 440. The processor 470 may control the switch 490 to connect the coil antenna 467 with the antenna driving circuit 480 when the temperature measured by the temperature sensor 410 satisfies the second specified condition (e.g., about 10° C. to 45° C.) after the charging event occurs. The processor 470 may control the switch 490 to connect the coil antenna 467 with the antenna driving circuit 480 when the temperature measured by the temperature sensor 410 satisfies the third specified condition (e.g., more than 25° C.) after supplying a current to the coil antenna 467 (or in the state of charging the battery 440 depending on the second charging characteristic).

According to an embodiment, the cost of the electronic device may be reduced and the space in the electronic device may be efficiently utilized, by using the coil antenna 467 included in the existing electronic device 400 without adding the heating element to the electronic device 400 to increase the temperature of the battery. In addition, the coil antenna 467 may be stably driven by switching a path connected with the coil antenna 467 depending on the state of the electronic device 400.

Figure 5A:
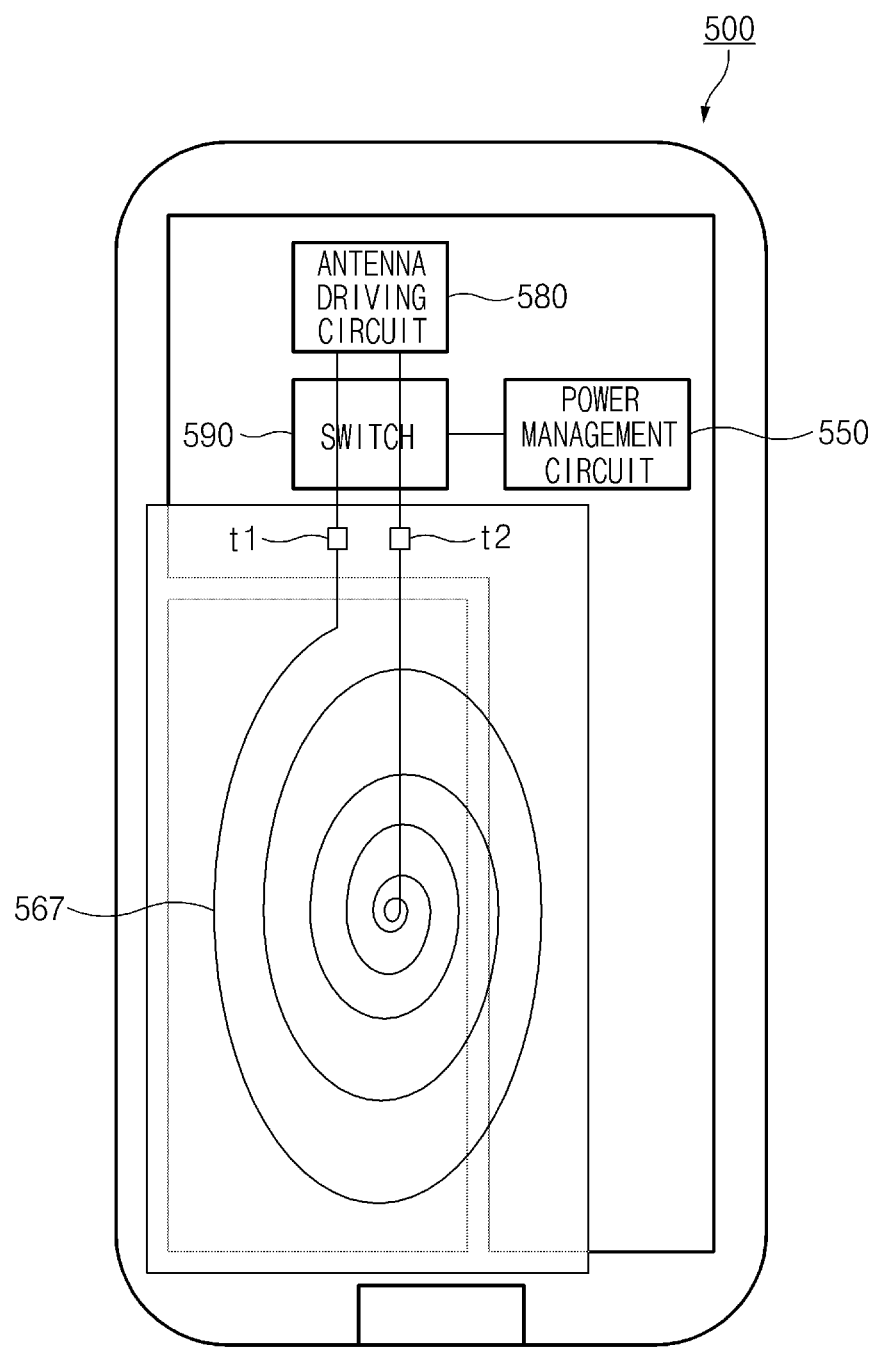
FIGS. 5A and 5B illustrate structures of an electronic device including a coil antenna, according to an embodiment.
Figure 5B:
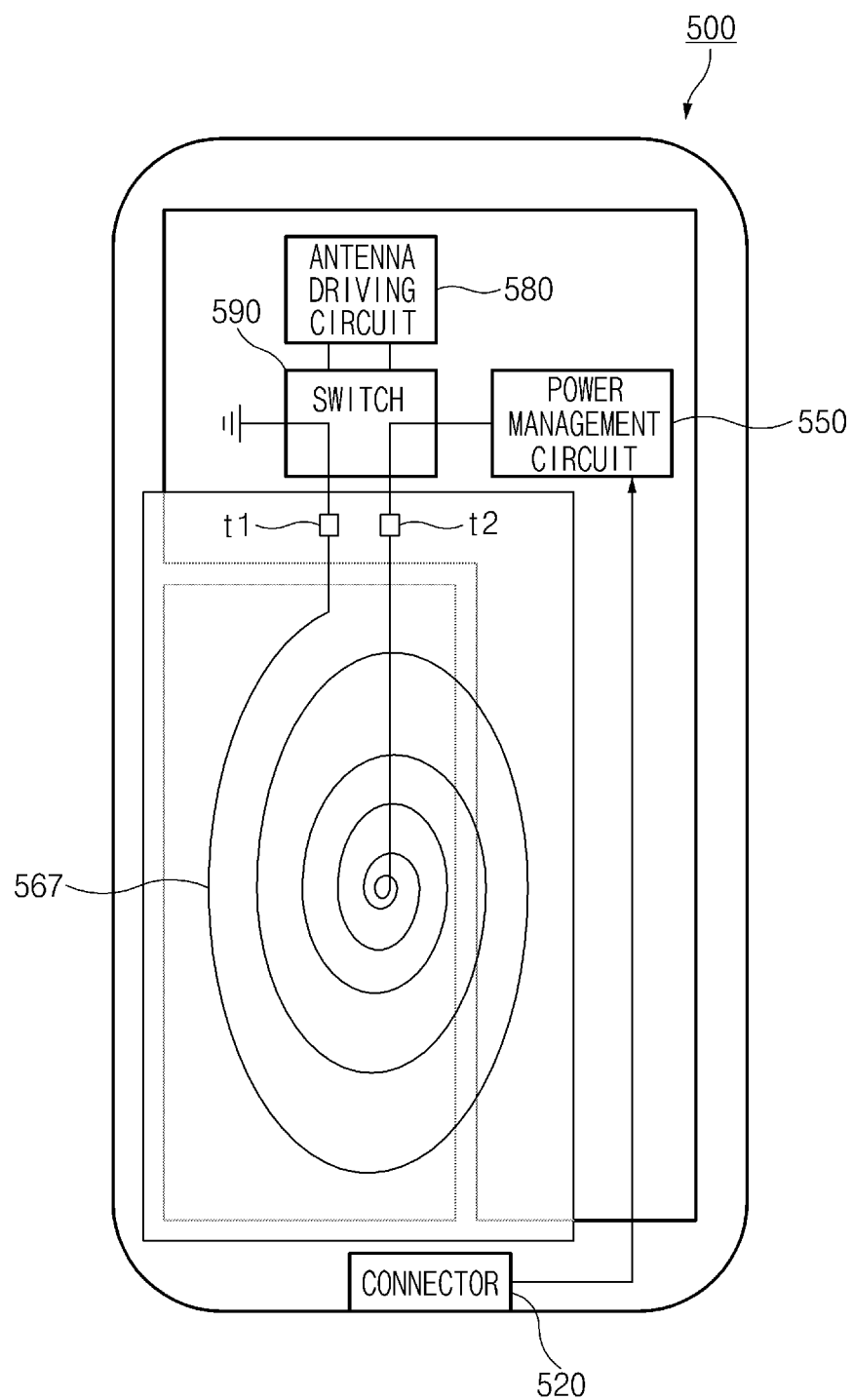

FIGS. 5A and 5B illustrate structures of electronic devices including coil antennas, according to an embodiment.

Referring to FIGS. 5A and 5B, an electronic device 500 may include a power management circuit 550, a coil antenna 567, an antenna driving circuit 580, and a switch 590. One end of the coil antenna 567 may be connected with a first terminal t1 and an opposite end of the coil antenna 567 may be connected with a second terminal t2.

Referring to FIG. 5A, the switch 590 may connect the coil antenna 567 with the antenna driving circuit 580. The switch 590 may connect the first terminal t1 of the coil antenna 567 and the second terminal t2 of the coil antenna 567 with the antenna driving circuit 580. The antenna driving circuit 580 may transmit or receive a signal to or from an external electronic device in the state that the antenna driving circuit 580 is connected with the coil antenna 567.

Referring to FIG. 5B, the switch 590 may connect the coil antenna 567 with the power management circuit 550. The switch 590 may connect the first terminal t1 of the coil antenna 567 with ground and may connect the second terminal t2 of the coil antenna 567 with the power management circuit 550. The power management circuit 550 may heat the coil antenna 567 by supplying the current to the coil antenna 567 in the state that the power management circuit 550 is connected with the coil antenna 567. The power management circuit 550 may be connected to the connector 520.

Figure 6:
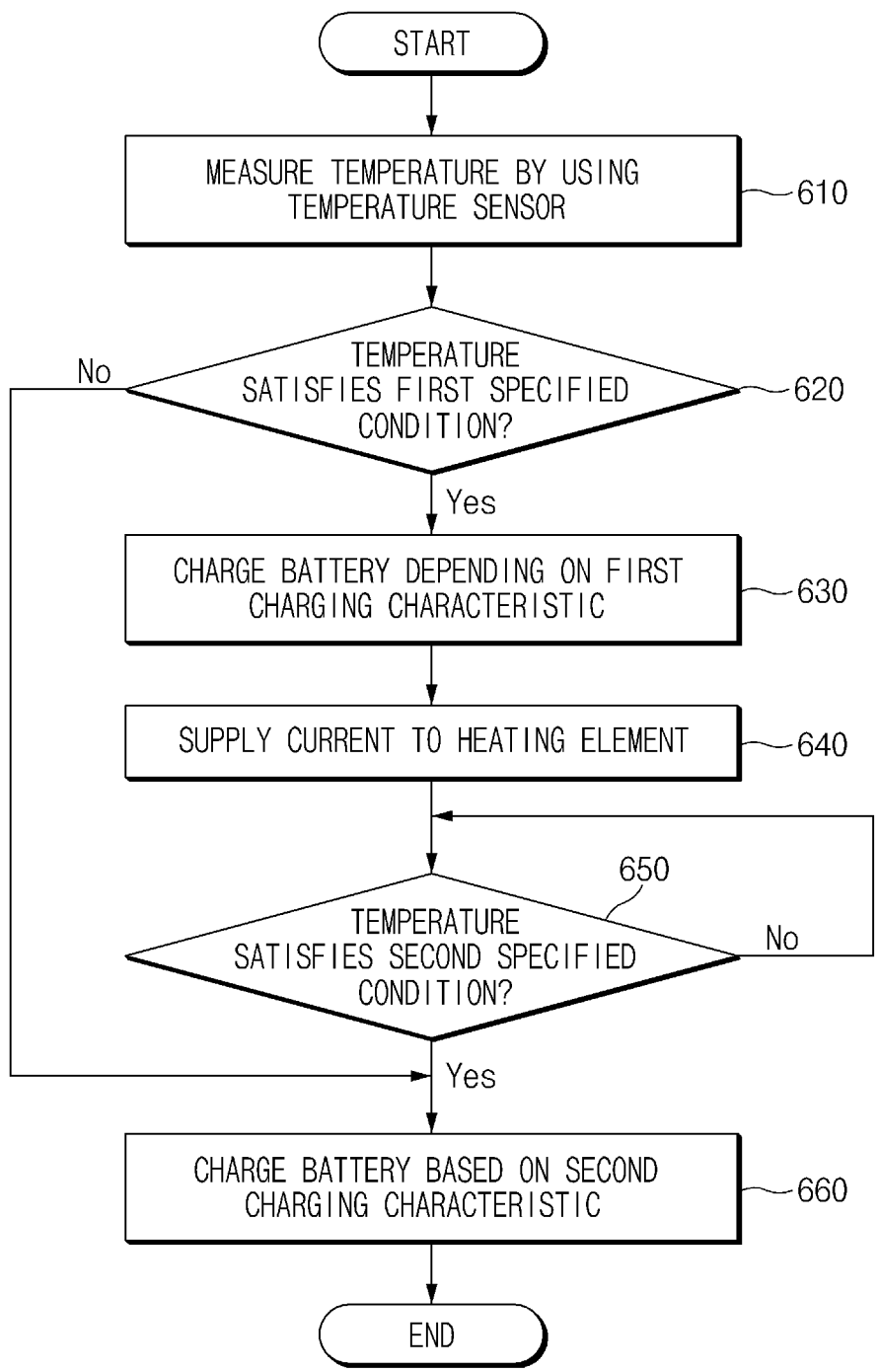
FIG. 6 is a flowchart illustrating a method of charging a battery of an electronic device, according to an embodiment.

FIG. 6 is a flowchart illustrating a method of charging a battery of an electronic device, according to an embodiment.

The flowchart illustrated in FIG. 6 illustrates operations processed in the above-described electronic devices 100, 201, 202, 301, 302, 303, 304, 400, or 500. Accordingly, the description of the electronic devices 100, 201, 202, 301, 302, 303, 304, 400, or 500 will be applied to the flowchart of FIG. 6 even if the details of the electronic device are omitted in the following description.

According to an embodiment, the electronic device may measure the temperature corresponding to at least a part of the electronic device by using the temperature sensor, in step 610. The electronic device may measure the temperature by using the temperature sensor when the charging event for the battery occurs. The electronic device may measure a temperature at a specific period or may periodically measure the temperature in response to the specific command.

According to an embodiment, the electronic device may determine whether the temperature measured by the temperature sensor satisfies the first specified condition, in step 620. For example, the electronic device may determine whether the temperature measured by the temperature sensor is less than 10° C.

According to an embodiment, the electronic device may charge the battery depending on the second charging characteristic in step 660 when the temperature measured by the temperature sensor does not satisfy the first specified condition (or satisfy the second specified condition).

According to an embodiment, the electronic device may charge the battery depending on the first charging characteristic in step 630 when the temperature measured by the temperature sensor satisfies the first specified condition.

According to an embodiment, the electronic device may supply a current to a heating element such that the heating element emits heat in step 640. The electronic device may supply the current to the heating element by using the power management circuit. The heating element may include a coil, a resistor, a heat pipe, or a thermoelectric device. The coil may include a coil antenna which includes an MST antenna, a wireless charging antenna, or an NFC antenna. The electronic device may perform a specific operation by using the processor such that the processor emits heat.

According to an embodiment, the electronic device may receive power from the external power source through the connector. The electronic device may determine available power except for power consumed to charge the battery in the power received through the connector and may supply the current to the heating element by using at least a portion of the determined available power.

According to an embodiment, although description has been made in that step 640 is performed after step 630, step 640 may be performed before step 630 or be performed simultaneously with step 630.

According to an embodiment, the electronic device may determine whether the temperature measured by the temperature sensor satisfies the second specified condition, in step 650. For example, the electronic device may determine whether the temperature measured by the temperature sensor is included in the range of 10° C. to 45° C.

According to an embodiment, if the electronic device determines the temperature measured by the temperature sensor does not satisfy the second specified condition in step 650, step 650 can be repeated.

According to an embodiment, the electronic device may charge the battery depending on the second charging characteristic in step 660 when the temperature measured by the temperature sensor satisfies the second specified condition. The second charging characteristic may include a charging power, a charging current, and a fully charged voltage higher than charging power, a charging current, and a fully charged voltage of the first charging characteristic.

Figure 7:
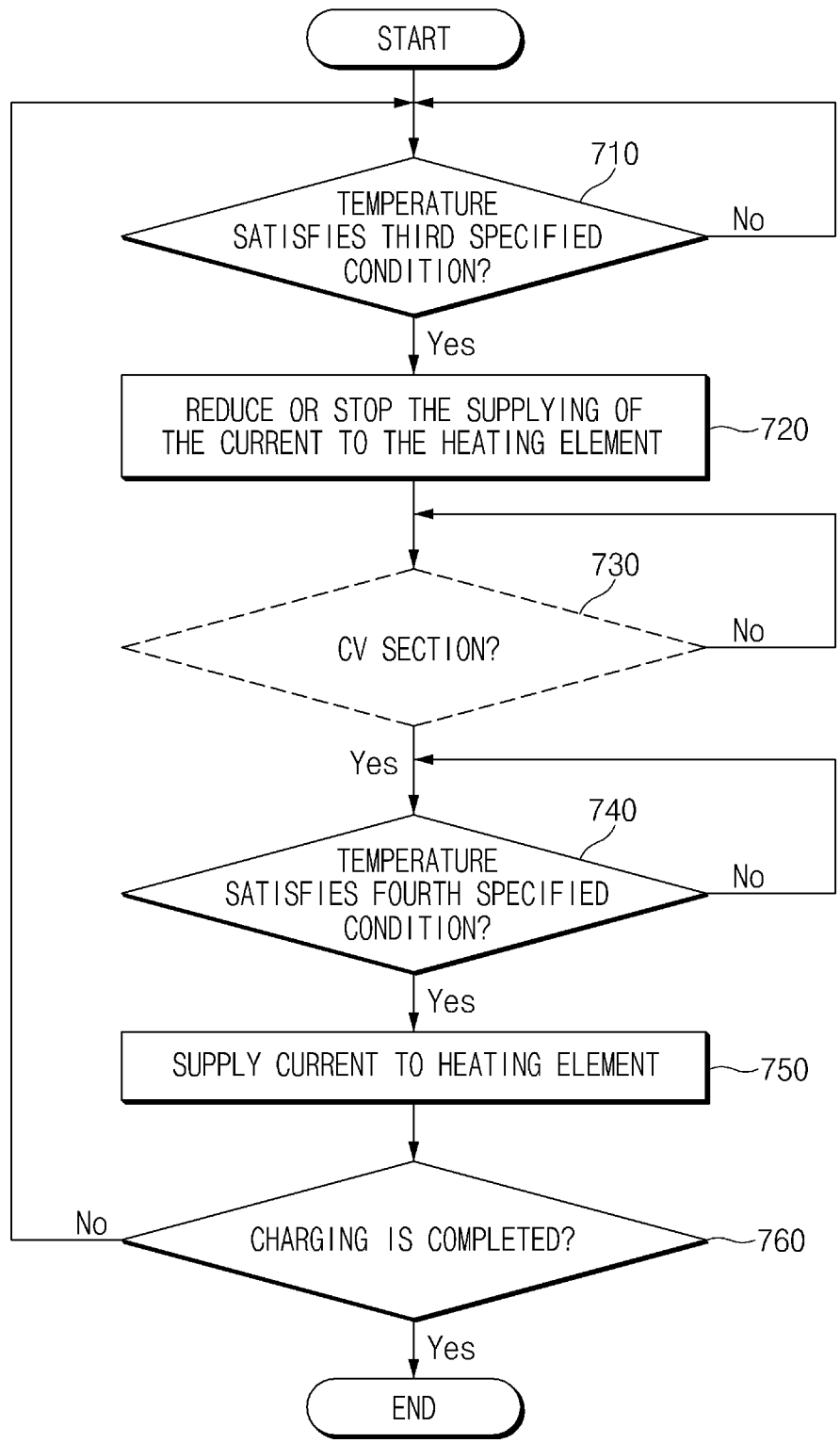
FIG. 7 is a flowchart illustrating a method of charging a battery of an electronic device, according to an embodiment.

FIG. 7 is a flowchart illustrating a method of charging a battery of an electronic device, according to an embodiment.

The flowchart illustrated in FIG. 7 may include operations processed in the electronic device 100, 201, 202, 301, 302, 303, 304, 400, or 500, and may be performed after step 660. Accordingly, the description of the electronic device made with reference electronic devices 100, 201, 202, 301, 302, 303, 304, 400, or 500 will be applied to the flowchart of FIG. 7, even if the details of the electronic device are omitted in the following description.

According to an embodiment, the electronic device may determine whether the temperature measured by the temperature sensor satisfies the third specified condition, in step 710. The electronic device may determine whether the temperature measured by the temperature sensor satisfies the third specified condition after supplying the current to the heating element (or in the state of charging the battery depending on the second charging characteristic) in step 640. For example, the electronic device may determine whether the temperature measured by the temperature sensor is more than 25° C.

According to an embodiment, the electronic device may reduce or stop the supplying of the current to the heating element (or the processing of dummy data using the processor) in step 720 when the temperature measured by the temperature sensor satisfies the third specified condition.

According to an embodiment, if the temperature measured by the temperature sensor does not satisfy the third specified condition, step 710 may be repeated.

According to an embodiment, the electronic device may determine whether the charging progress state of the battery corresponds to the CV section in step 730.

According to an embodiment, the electronic device may determine whether the temperature measured by the temperature sensor satisfies the fourth specified condition, in step 740 when the charging progress state of the battery corresponds to the CV section. For example, the electronic device may determine whether the temperature measured by the temperature sensor is less than 10° C. or less than 15° C.

According to an embodiment, if the charging progress state of the battery does not correspond to the CV section in step 730, then step 730 may be repeated.

According to an embodiment, the electronic device may not perform step 730. For example, the electronic device may perform step 740 after step 720 regardless of the charging progress state of the battery.

According to an embodiment, the electronic device may increase the current supplied to the heating element (or may create an amount of data using the processor) or may supply (or perform a specific operation using the processor) the current to the heating element, in step 750 when the temperature measured by the temperature sensor satisfies the fourth specified condition. The electronic device may supply the current to the heating element by using the power management circuit.

According to an embodiment, when the temperature measured by the temperature sensor does not satisfy the fourth specified condition in step 740, step 740 may be repeated.

According to an embodiment, the electronic device may determine whether the battery is completely charged (or whether the battery is disconnected from the external power source), in step 760. The electronic device may terminate the procedure of charging when the charging of the battery is completed or the battery is disconnected from the external power source. The electronic device may repeat steps 710 to 760 when the charging of the battery is not completed.

Figure 8:
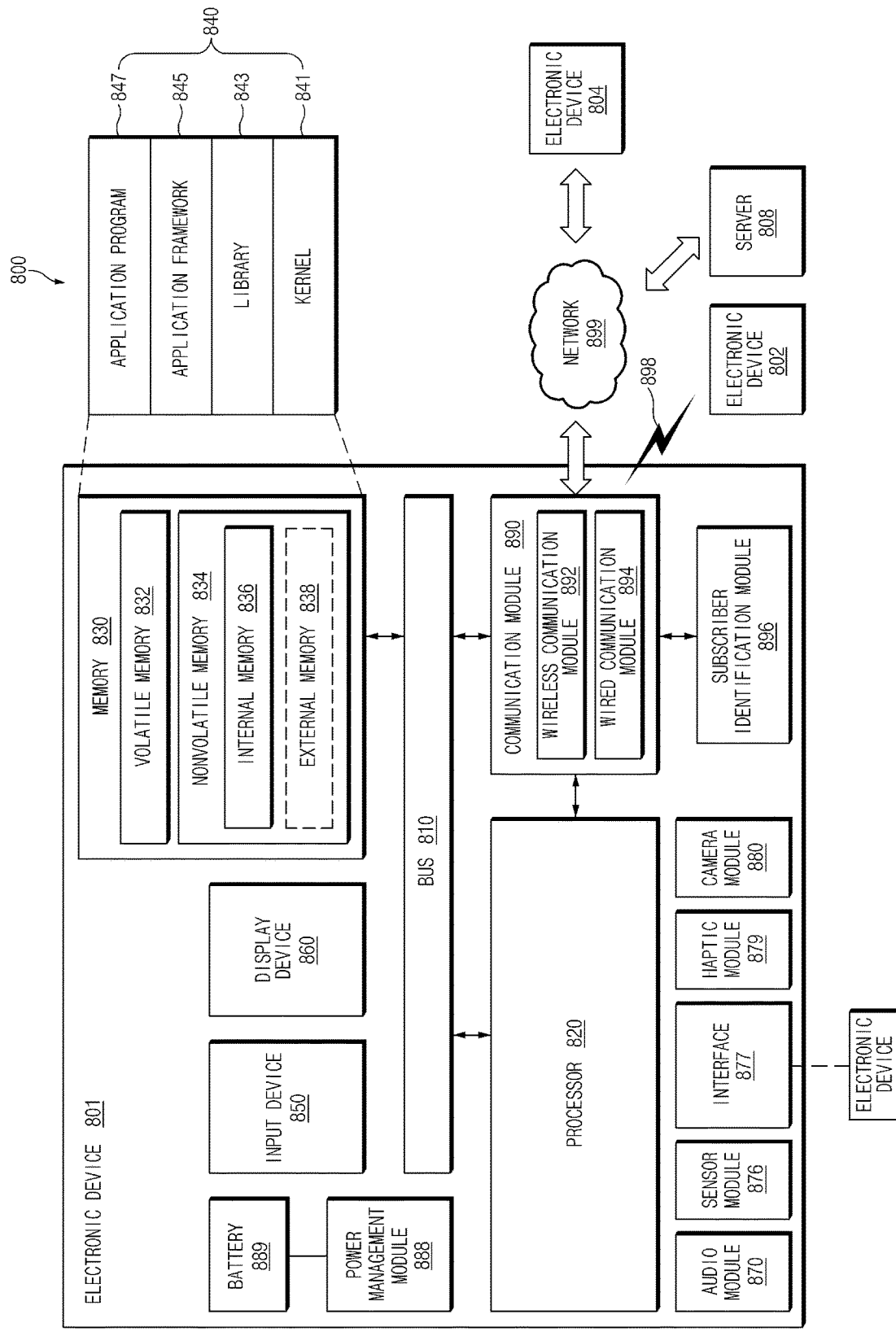
FIG. 8 is a block diagram illustrating an electronic device in a network environment, according to an embodiment.

FIG. 8 illustrates an electronic device in a network environment system, according to an embodiment.

FIG. 8 is a block diagram illustrating an electronic device 801 in a network environment 800 according to an embodiment. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). The electronic device 801 may communicate with the electronic device 804 via the server 808. The electronic device 801 may include a bus 810, a processor 820, memory 830, an input device 850 (e.g., a micro-phone or a mouse), a sound output device, a display device 860, an audio module 870, a sensor module 876, an interface 877, a haptic module 879, a camera module 880, a power management module 888, a battery 889, a communication module 890, a subscriber identification module (SIM) 896, or an antenna module. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

An electronic device according to an embodiment may include various forms of devices. For example, the electronic device may include portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or motion picture experts group (MPEG-1 or MPEG-2) audio layer 3 (MP3) players), portable medical devices (e.g., heartbeat measuring devices, blood glucose monitoring devices, blood pressure measuring devices, and body temperature measuring devices), cameras, or wearable devices. The wearable device may include an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). The electronic device may include televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

According to an embodiment, the electronic device may include navigation devices, a satellite navigation system (e.g., global navigation satellite system (GNSS)), event data recorders (EDRs) (e.g., a black box for a car, a ship, or a plane), vehicle infotainment devices (e.g., a head-up display for vehicle), industrial or home robots, drones, automatic teller machines (ATMs), points of sales (POSs) devices, measuring instruments (e.g., water meters, electricity meters, or gas meters), or Internet of things (IoT) devices (e.g., light bulbs, sprinkler devices, fire alarms, thermostats, or street lamps). The electronic device may not be limited to the above-described devices, and may provide functions of a plurality of devices like smartphones which has measurement function of personal biometric information (e.g., heart rate or blood glucose level). In the present disclosure, the term "user" may refer to a person who uses an electronic device or may refer to a device (e.g., an artificial intelligence (AI) electronic device) that uses the electronic device.

Under the network environment 800, the electronic device 801 may communicate with the electronic device 802 through the first network 898 or may communication with the electronic device 804 or a server 808 through the second network 899. The electronic device 801 may communicate with the electronic device 804 through the server 808.

The bus 810 may interconnect the above-described elements 820 to 890 and may include a circuit for conveying signals (e.g., a control message or data) between the above-described elements.

The processor 820 may execute, for example, software (e.g., a program 840) to control at least one other component (e.g., a hardware or software component) of the electronic device 801 coupled with the processor 820, and may perform various data processing or computation. According to an embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor a CPU or an application processor (AP)), and an auxiliary processor (e.g., a GPU, an image signal processor (ISP), a sensor hub processor, or a communication processor (CP)) that is operable independently from, or in conjunction with, the main processor. Additionally or alternatively, the auxiliary processor may be adapted to consume less power than the main processor, or to be specific to a specified function. The auxiliary processor may be implemented as separate from, or as part of the main processor 821.

According to an embodiment, the processor 820 may be implemented with an SoC or a system in package (SiP). For example, the processor 820 may drive an operating system (OS) or an application to control at least one of another element (e.g., hardware or software element) connected to the processor 820 and may process and compute various data. The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The memory 830 may include the volatile memory 832 or the nonvolatile memory 834. The volatile memory 832 may include a random access memory (RAM) (e.g., a dynamic RAM (DRAM), a static RAM (SRAM), or a synchronous DRAM (SDRAM)). The nonvolatile memory 834 may include, for example, an one time programmable read-only memory (OTPROM), a programmable read-only memory (PROM), an erasable programmable read-only memory (EPROM), an electrically erasable programmable read-only (EEPROM), a mask ROM, a flash ROM, a flash memory, a hard disk drive (HDD), or a solid-state drive (SSD). In addition, the nonvolatile memory 834 may be configured in the form of an internal memory 836 or the form of an external memory 838 which is available through connection only if necessary, according to the connection with the electronic device 801. The external memory 838 may further include a flash drive such as compact flash (CF), secure digital (SD), micro secure digital (Micro-SD), mini secure digital (Mini-SD), extreme digital (xD), a multimedia card (MMC), or a memory stick. The external memory 838 may be operatively or physically connected with the electronic device 801 in a wired method (e.g., a cable or a universal serial bus (USB)) or a wireless (e.g., Bluetooth™) method.

The memory 830 may store at least one different software element, such as an instruction or data associated with the program 840, of the electronic device 801. The program 840 may include a kernel 841, a library 843, an application framework 845, or an application 847.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard. According to an embodiment, the keyboard may include a keyboard physically connected or a virtual keyboard displayed through the display 860.

The sound output device may output sound signals to the outside of the electronic device 801. The sound output device may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The display 860 may include a liquid crystal display (LCD), a light emitting diode (LED) display, an organic LED (OLED) display, a micro electro mechanical systems (MEMS) display, or an electronic paper display. According to an embodiment, the display 860 may be flexibly, transparently, or wearably implemented. The display 860 may include a touch circuitry, which is able to detect a user's input such as a gesture input, a proximity input, or a hovering input or a pressure sensor (e.g., a force sensor) which is able to measure the intensity of the pressure by the touch. The touch circuit or the pressure sensor may be integrated with the display 860 or may be implemented with at least one sensor separately from the display 860. The hologram device may show a stereoscopic image in a space using interference of light. The projector may project light onto a screen to display an image. The screen may be located inside or outside the electronic device 801.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801. The sensor module 876 may measure or detect an internal operating state (e.g., power or temperature) of the electronic device 801 or an external environment state (e.g., an altitude, a humidity, or brightness) to generate an electrical signal or a data value corresponding to the information of the measured state or the detected state. The sensor module 876 may include, for example, a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 876 may further include a control circuit for controlling at least one or more sensors included therein. According to an embodiment, the sensor module 876 may be controlled by using the processor 820 or a processor (e.g., a sensor hub) separate from the processor 820. In the case that the separate processor (e.g., a sensor hub) is used, while the processor 820 is in a sleep state, the separate processor may operate without awakening the processor 820 to control at least a portion of the operation or the state of the sensor module 876.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a USB interface, a SD card interface, an audio interface, a recommended standard 232 (RS-232), a D-subminiature (D-sub), a mobile high-definition link (MHL) interface, or an SD card/MMC interface.

A connector may physically connect the electronic device 801 and the electronic device 806. The haptic module 879 may convert an electrical signal into mechanical stimulation (e.g., vibration or motion) or into electrical stimulation which may be recognized by a user via tactile sensation or kinesthetic sensation. According to an embodiment, the haptic module 879 may include a motor, a piezoelectric element, or an electric stimulator.

The camera module 880 may capture a still image or moving images. According to an embodiment, the camera module 880 may include one or more lenses (e.g., a wide-angle lens and a telephoto lens, or a front lens and a rear lens), an image sensor, an image signal processor, or a flash (e.g., a light emitting diode or a xenon lamp).

The power management module 888 may manage power supplied to the electronic device 801. According to one embodiment, the power management module 888 may be implemented as at least part of, for example, a PMIC. The battery 889 may supply power to at least one component of the electronic device 801. According to an embodiment, the battery 889 may include, for example, a primary cell which is not rechargeable, a secondary cell which is rechargeable, or a fuel cell. The battery 889 may be recharged by an external power source to supply power to at least one element of the electronic device 801.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. According to an embodiment, the communication module 890 may include a wireless communication module 892 (e.g., a cellular communication module, a short-range wireless communication module, or a GNSS communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™ wireless-fidelity (Wi-Fi) direct, or Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support cellular communication, local wireless communication, GNSS communication. The cellular communication may include long-term evolution (LTE), LTE advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi direct, light fidelity (Li-Fi), Bluetooth, Bluetooth low energy (BLE), Zigbee, NFC, MST, radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), etc. In the present disclosure, the term "GPS" and the term "GNSS" may be interchangeably used.

According to an embodiment, when the wireless communication module 892 supports cellar communication, the wireless communication module 892 may identify or authenticate the electronic device 801 within a communication network using the SIM 896 (e.g., a SIM card). The wireless communication module 892 may include a CP separate from the processor 820 (e.g., an AP). In this case, the communication processor may perform at least a portion of functions associated with at least one of elements 810 to 896 of the electronic device 801 in substitute for the processor 820 when the processor 820 is in an inactive (sleep) state, and together with the processor 820 when the processor 820 is in an active state. The wireless communication module 892 may include a plurality of communication modules, each supporting only a relevant communication scheme among cellular communication, local wireless communication, or a GNSS communication.

The wired communication module 894 may include, for example, include a LAN service, a power line communication, or a plain old telephone service (POTS).

The first network 898 may employ Wi-Fi direct or Bluetooth for transmitting or receiving commands or data through wireless direct connection between the electronic device 801 and the first external electronic device 802. The second network 899 may include a telecommunication network (e.g., a computer network (e.g., a LAN or a WAN), the Internet or a telephone network) for transmitting or receiving commands or data between the electronic device 801 and the second electronic device 804.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to various embodiments, the commands or the data may be transmitted or received between the electronic device 801 and the electronic device 804 through the server 808 connected with the second network 899. Each of the first external electronic devices 802 and electronic device 804 may be a device of which the type is different from or the same as that of the electronic device 801. According to an embodiments, all or a part of operations that the electronic device 801 will perform may be executed by another or a plurality of electronic devices (e.g., the electronic devices 802, the electronic device 804, or the server 808). In the case that the electronic device 801 executes any function or service automatically or in response to a request, the electronic device 801 may not perform the function or the service internally, but may alternatively or additionally transmit requests for at least a portion of a function associated with the electronic device 801 to any other device. The other electronic device may execute the requested function or additional function and may transmit the execution result to the electronic device 801. The electronic device 801 may provide the requested function or service using the received result or may additionally process the received result to provide the requested function or service. To this end a cloud computing, a distributed computing, or a client-server computing may be used.

Figure 9:
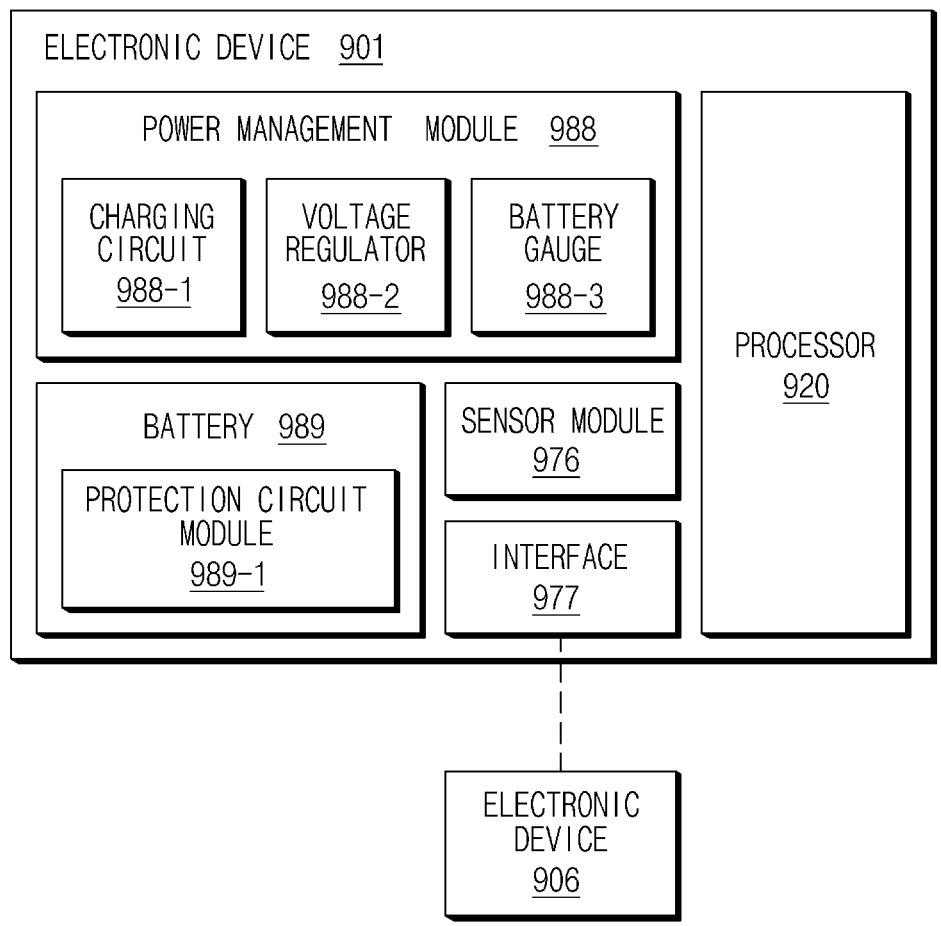
FIG. 9 is a block diagram illustrating an electronic device including a power management module and the battery, according to an embodiment.

FIG. 9 is a block diagram illustrating a power management module and a battery of an electronic device 901, according to an embodiment.

Referring to FIG. 9, a power management module 988 may include a charging circuit 988-1, a voltage regulator 988-2, and a battery gauge 988-3. The power management module 988 may not include some elements (e.g., the battery gauge 988-3) or may additionally include another element. According to an embodiment, the charging circuit 988-1, the voltage regulator 988-2, or the battery gauge 988-3 may be configured separately from the power management module 988.

The charging circuit 988-1 may perform fast charging for the battery 989, based on the type of an external electronic device 906 (e.g., a power adaptor or an USB) or at least a portion of an amount (e.g., about 20 watt or more) of power which is able to be received from the external electronic device 906

The voltage regulator 988-2 may generate power having various voltage levels and may provide the generated power to the elements of electronic device 901. According to an embodiment, the voltage regulator 988-2 may include a low drop out (LDO) regulator or a switching regulator.

The battery gauge 988-3 may measure first state information (e.g., the capacity of the battery 989, the number of times that the battery 989 is charged or discharged, the temperature of the battery 989, or a voltage of the battery 989) of the battery 989.

The power management module 988 may determine second state information (e.g., the lifespan, overvoltage, undervoltage, overcurrent, overcharging, overheating, shorting, or swelling of the battery 989) based on at least a portion of the first state information.

The processor 920 may control at least some functions of the power management module 988 or at least some elements (e.g., the charging circuit 988-1) of the power management module 988 based on at least a portion of the second state information. According to an embodiment, the processor 920 may determine whether the battery 989 is abnormal or normal, based on a portion of the second state information. When it is determined that the battery 989 is in the abnormal state, the processor 920 may control the charging circuit 988-1 to perform the charging operation (e.g., the reduction in a charging current or voltage, or charging stop) with respect to the battery 989.

According to an embodiment, the battery 989 may include a protection circuit module (PCM) 989-1 to reduce the deterioration in the performance of the battery 989. The protection circuit module 989-1 may perform a first operation or a first function, which is previously defined, when the overvoltage, the overcurrent, the overheating, the overdischarging, or the short circuiting of the battery 989 is detected. The first operation or the first function may protect the battery 989 from being burned. The protection circuit module 989-1 may constitute at least a part of a battery management system (BMS) to perform cell balancing or measure the capacity of the battery 989, the number of times that the battery 989 is charged or discharged, the temperature of the battery 989, or a voltage of the battery 989 in addition to the protection of the battery 989 from being burned.

A sensor module 976 may measure a portion of the state information of the battery 989 independently from the battery gauge 988-3 (e.g., alternatively or additionally to the battery gauge 988-3). According to an embodiment, the sensor module 976 may constitute a part of the protection circuit module 989-1 or may be configured separately from the protection circuit module 989-1 to be disposed adjacent to the battery 989.

An interface 977 may receive data or power from the external electronic device 906 (e.g., a power adaptor, a power charger, or an external battery) or may provide data or power to the external electronic device 906 (e.g., a portable communication device or a wearable device). According to an embodiment, the interface 977 may support a wired charging (e.g., USB) method or a wireless charging (e.g., a magnetic induction, magnetic resonance, or electromagnetic method). The interface 977 may further include an additional circuit for wireless charging, for example, a coil loop, a resonant circuit, or a rectifier.

Various embodiments of the present disclosure and terms used herein do not limit the technologies described in the present disclosure to specific embodiments, and it should be understood that the embodiments and the terms include modifications, equivalents, and/or alternatives on the corresponding embodiments described herein. With regard to description of drawings, similar elements may be marked by similar reference numerals. The terms of a singular form may include plural forms unless otherwise specified. In the present disclosure, the expressions "A or B", "at least one of A and/or B", "at least one of A and/or B", "A, B, or C", or "at least one of A, B, and/or C", etc. used herein may include any and all combinations of one or more of the associated listed items. Expressions such as "first", "second", etc., may express their elements regardless of their priority or importance, and may be used to distinguish one element from another element but is not limited to these components. When an element (e.g., first element) is referred to as being "(operatively or communicatively) coupled with/to" or "connected to" another element (e.g., second element), it may be directly coupled with/to or connected to the other element or an intervening element (e.g., a third element) may be present.

According to the situation, the expression "adapted to or configured to" used herein may be interchangeably used with the expressions "suitable for", "having the capacity to", "changed to", "made to", "capable of", or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a CPU or an application processor) which performs corresponding operations by executing one or more software programs which are stored in a memory device (e.g., the memory 830).

The term "module" used herein may include a unit, which is implemented with hardware, software, or firmware, and may be interchangeably used with the terms "logic", "logical block", "component", "circuit", etc. The "module" may be a minimum unit of an integrated component or a part thereof, or may be a minimum unit for performing one or more functions or a part thereof. The "module" may be implemented mechanically or electronically and may include, for example, an application specific IC (ASIC) chip, a field programmable gate array (FPGA), and a programmable-logic device for performing some operations, which are known or will be developed.

According to an embodiment, a method according to an embodiment may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, at least a part of an apparatus (e.g., modules or functions thereof) or a method (e.g., operations) may be implemented by instructions stored in a computer-readable storage media (e.g., the memory 830) in the form of a program module. The instruction, when is executed by a processor (e.g., a processor 820), may cause the processor to perform a function corresponding to the instruction. The computer-readable recording medium may include a hard disk, a floppy disk, a magnetic media (e.g., a magnetic tape), an optical media (e.g., a CD-ROM and a DVD, a magneto-optical media (e.g., a floptical disk)), an embedded memory, etc. The one or more instructions may contain a code made by a compiler or a code executable by an interpreter.

Each element (e.g., a module or a program module) according to an embodiment may be composed of a single entity or a plurality of entities, a part of the above-described sub-elements may be omitted or may further include other sub-elements. Alternatively or additionally, after being integrated in one entity, some elements (e.g., a module or a program module) may identically or similarly perform the function executed by each corresponding element before integration. Operations executed by modules, program modules, or other elements may be executed by a successive method, a parallel method, a repeated method, or a heuristic method, or at least one part of operations may be executed in different sequences or omitted. Alternatively, other operations may be added.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure as defined in the appended claims and their equivalents.

What is claimed is:

1. An electronic device comprising:
    a battery;
    a temperature sensor;
    a charging circuit configured to charge the battery;
    a coil antenna; and
    at least one processor configured to:
        measure a temperature corresponding to at least a part of the electronic device by using the temperature sensor;
        charge the battery depending on a first charging characteristic by using the charging circuit and supply a current to the coil antenna to allow the coil antenna to emit heat, when the temperature satisfies a first specified condition; and
        charge the battery depending on a second charging characteristic by using the charging circuit, when the temperature satisfies a second specified condition, after the current is supplied,
    wherein a temperature range of the first specified condition is lower than a temperature range of the second specified condition, and
    wherein the second charging characteristic includes a charging power, a charging current, and a fully charged voltage higher than a charging power, a charging current, and a fully charged voltage of the first charging characteristic.

2. The electronic device of claim 1, wherein the coil antenna includes:
    a magnetic secure transmission (MST) antenna, a wireless charging antenna, or a near field communication (NFC) antenna.

3. The electronic device of claim 1, further comprising:
    a housing constituting at least a part of a first surface of the electronic device; and
    a display constituting at least a part of a second surface facing a direction opposite to a direction of the first surface of the electronic device,
    wherein the battery is disposed between the first surface and the second surface, and wherein the coil antenna is disposed between the first surface and the second surface and overlaps with at least a partial region of the battery.

4. The electronic device of claim 1, further comprising:
a power management circuit configured to supply the current to the coil antenna;
an antenna driving circuit configured to transmit or receive a signal through the coil antenna; and
a switch configured to selectively connect the coil antenna with the power management circuit or the antenna driving circuit,
wherein the at least one processor or the power management circuit is configured to:
connect the coil antenna with the power management circuit by using the switch, when the temperature satisfies the first specified condition.

5. The electronic device of claim 1, wherein the at least one processor is further configured to:
emit heat by performing a specified operation, when the temperature satisfies the first specified condition.

6. The electronic device of claim 1, further comprising:
a heating element including a coil, a resistor, a heat pipe, or a thermoelectric device,
wherein the at least one processor is further configured to:
allow the heating element to emit heat by supplying a current to the heating element, when the temperature satisfies the first specified condition.

7. The electronic device of claim 1, further comprising:
a thermal diffusion sheet attached to the battery and configured to transfer heat, which is emitted from an outside of the battery, to the battery.

8. The electronic device of claim 1, wherein the at least one processor is further configured to:
set a magnitude of a current used for the charging of the battery to a first magnitude as at least a part of the first charging characteristic; and
set the magnitude of the current used for the charging of the battery to a second magnitude greater than the first magnitude, as at least a part of the second charging characteristic.

9. The electronic device of claim 1, wherein the at least one processor is further configured to:
reduce a magnitude of the current supplied to the coil antenna or stop supplying the current to the coil antenna, when the temperature satisfies a third specified condition, after the current is supplied.

10. The electronic device of claim 9, wherein the at least one processor is further configured to:
increase the magnitude the current supplied to the coil antenna or resume supplying the current to the coil antenna, when the temperature satisfies a fourth specified condition, after reducing the current supplied to the coil antenna or stopping supplying the current to the coil antenna.

11. The electronic device of claim 1, further comprising:
a connector configured to receive power from an external power source,
wherein the at least one processor is further configured to:
determine available power, except for power consumed to charge the battery, in the power received through the connector; and
supply the current to the coil antenna by using at least a portion of the available power.

12. A method of charging a battery of an electronic device, the method comprising:
measuring a temperature corresponding to at least a part of the electronic device by using a temperature sensor;
charging the battery depending on a first charging characteristic by using a charging circuit, when the temperature satisfies a first specified condition;
supplying a current to a coil antenna to allow the coil antenna to emit heat, when the temperature satisfies the first specified condition; and
charging the battery depending on a second charging characteristic by using the charging circuit, when the temperature satisfies a second specified condition, after the current is supplied,
wherein a temperature range of the first specified condition is lower than a temperature range of the second specified condition, and
wherein the second charging characteristic includes a charging power, a charging current, and a fully charged voltage higher than a charging power, a charging current, and a fully charged voltage of the first charging characteristic.

13. The method of claim 12, wherein charging the battery depending on the first charging characteristic includes:
setting a magnitude of a current used for the charging of the battery to a first magnitude as at least a part of the first charging characteristic; and
wherein charging the battery based on the second charging characteristic includes:
setting the magnitude of the current used for the charging of the battery to a second magnitude greater than the first magnitude, as at least a part of the second charging characteristic.

14. The method of claim 12, further comprising:
reducing the current supplied to the coil antenna or stopping supplying the current to the coil antenna, when the temperature satisfies a third specified condition, after the current is supplied.

15. The method of claim 14, further comprising:
increasing a magnitude of the current supplied to the coil antenna or resuming supplying the current to the coil antenna, when the temperature satisfies a fourth specified condition, after reducing the magnitude of the current supplied to the coil antenna or stopping supplying the current to the coil antenna.

16. The method of claim 12, wherein supplying the current to the coil antenna includes:
receiving power from an external power source through a connector;
determining available power, except for power consumed to charge the battery, in the power received through the connector; and
supplying the current to the coil antenna by using at least a portion of the available power.

17. An electronic device comprising:
a battery;
a temperature sensor;
a charging circuit;
a heating element; and
at least one processor configured to:
measure a temperature corresponding to at least a part of the electronic device by using the temperature sensor;
charge the battery depending on a first charging characteristic by using the charging circuit and supply a current to the heating element to allow the heating element to emit heat, when the temperature satisfies a first specified condition;
charge the battery depending on a second charging characteristic by using the charging circuit, when the temperature satisfies a second specified condition, after the current is supplied to the heating element; and reduce a magnitude of the current supplied to the heating element or stop supplying the current to the heating element, when the temperature satisfies a third specified condition, after the current is supplied, wherein a temperature range of the first specified condition is lower than a temperature range of the second specified condition, and wherein the second charging characteristic includes a charging power, a charging current, and a fully charged voltage higher than a charging power, a charging current, and a fully charged voltage of the first charging characteristic.

18. The electronic device of claim 17, wherein the heating element includes:

a coil antenna, a coil, a resistor, a heat pipe, a thermoelectric device, the processor, another processor different from the processor, or a combination of the coil antenna, the coil, the resistor, the heat pipe, the thermoelectric device, the processor, and the other processor.

19. The electronic device of claim 17, wherein the at least one processor is further configured to:

set a magnitude of a current used for the charging of the battery to a first magnitude as at least a part of the first charging characteristic; and set the magnitude of the current used for the charging of the battery to a second magnitude greater than the first magnitude, as at least a part of the second charging characteristic.

20. The electronic device of claim 17, further comprising:

a connector configured to receive power from an external power source, wherein the at least one processor is further configured to:

determine available power, except for power consumed to charge the battery, in the power received through the connector; and supply the current to the heating element by using at least a portion of the available power.

* * * * *